US011685303B2

(12) United States Patent
Currier et al.

(10) Patent No.: US 11,685,303 B2
(45) Date of Patent: Jun. 27, 2023

(54) BERTH APPARATUS AND METHODS USING PHYSIOLOGICAL PARAMETERS FOR CONTROLLING BERTH MOTION TO PROMOTE RELAXATION AND TO INDUCE SLEEP

(71) Applicant: Cabin Technologies, Inc., San Francisco, CA (US)

(72) Inventors: Thomas J. Currier, San Francisco, CA (US); Christopher A. Tacklind, Menlo Park, CA (US)

(73) Assignee: Daniel R. Brettschneider, Tacoma, WA (US)

( * ) Notice: Subject to any disclaimer, the term of this patent is extended or adjusted under 35 U.S.C. 154(b) by 673 days.

(21) Appl. No.: 16/557,985

(22) Filed: Aug. 30, 2019

(65) Prior Publication Data

US 2020/0070712 A1 Mar. 5, 2020

Related U.S. Application Data

(60) Provisional application No. 62/726,115, filed on Aug. 31, 2018.

(51) Int. Cl.
*B60P 3/38* (2006.01)
*B60N 2/50* (2006.01)
(Continued)

(52) U.S. Cl.
CPC .............. *B60P 3/38* (2013.01); *B60N 2/501* (2013.01); *F16F 15/02* (2013.01); *B60N 2/34* (2013.01);
(Continued)

(58) Field of Classification Search
CPC ...... B60P 3/38; B60P 3/39; B60P 3/36; B60N 2/34; B60N 2/501; B60N 3/008;
(Continued)

(56) References Cited

U.S. PATENT DOCUMENTS 1,998,206 A 4/1935 Rosenzweig
2,281,955 A 5/1942 Rosenzweig
(Continued)

FOREIGN PATENT DOCUMENTS

WO WO-2019221620 A1 * 11/2019 ............. A61G 3/006

OTHER PUBLICATIONS

ABS—American Bureau of Shipping, "Crew Habitability on Offshore Installations", Guide by American Bureau of Shipping, May 1, 2002, 122 pgs., Houston, TX.
(Continued)

*Primary Examiner* — Tan Le
(74) *Attorney, Agent, or Firm* — Marek Alboszta

(57) ABSTRACT

A berth apparatus and method for promoting relaxation and/or inducing sleep in a recumbent passenger occupying a berth belonging to the berth apparatus. The apparatus is mounted in a vehicle and has a secondary suspension with a vibration detection system and a motion management system. The berth may execute motion in all six degrees of freedom with at least the vertical degree of freedom being monitored for unwanted motion. The motion management system has a motion removing component for removing unwanted motion in at least the vertical degree of freedom, and it also has a motion adding component to add to the berth a desirable motion of low frequency and small amplitude in at least one degree of freedom based on a physiological parameter, e.g., the inhalation cycle of the recumbent passenger. The apparatus and method may further use a vibration transfer element to transfer motion in one degree of freedom, such as horizontal displacement, to another degree of freedom, such as roll.

19 Claims, 16 Drawing Sheets

Figure 1:
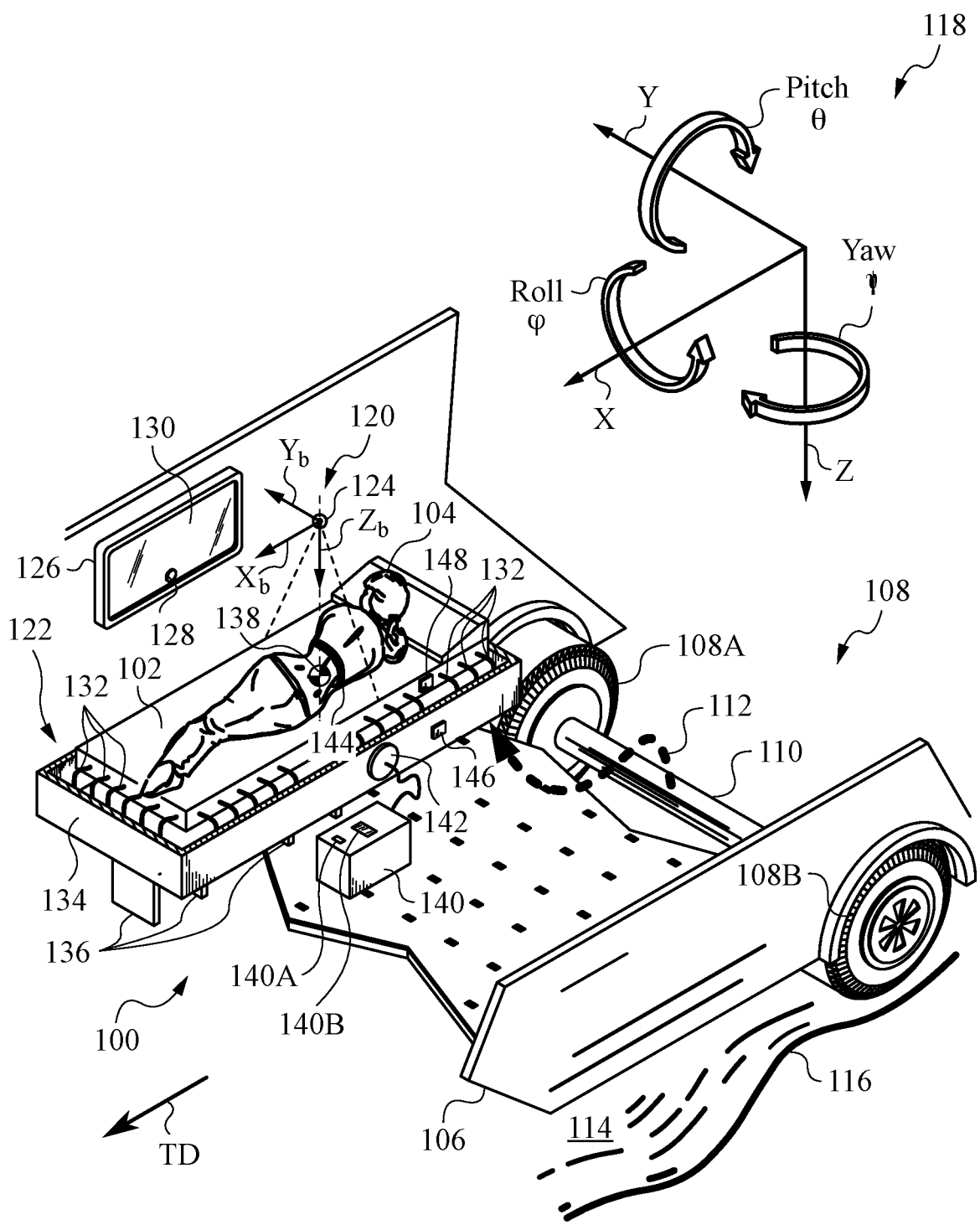

(51) Int. Cl.
*F16F 15/02* (2006.01)
*B62D 33/06* (2006.01)
*B60N 2/34* (2006.01)
*B60P 3/39* (2006.01)
*F16F 9/00* (2006.01)

(52) U.S. Cl.
CPC ............... *B60P 3/39* (2013.01); *B62D 33/06* (2013.01); *F16F 9/00* (2013.01)

(58) Field of Classification Search
CPC .......... F16F 15/02; F16F 15/022; F16F 15/10; F16F 15/00; F16F 9/00
See application file for complete search history.

(56) References Cited

U.S. PATENT DOCUMENTS

| | | | |
|---|---|---|---|
| 3,701,499 | A | 10/1972 | Schubert et al. |
| 3,760,436 | A * | 9/1973 | Zach .................... A47C 21/00 5/103 |
| 3,882,558 | A | 5/1975 | Christensen |
| 3,966,009 | A | 6/1976 | Meacockll et al. |
| 4,107,797 | A | 8/1978 | Maxwell |
| 4,265,328 | A | 5/1981 | Rowa et al. |
| 4,713,851 | A | 12/1987 | Rosquist |
| 4,783,038 | A | 11/1988 | Gilbert et al. |
| 4,977,631 | A | 12/1990 | Bretz |
| 5,052,529 | A | 10/1991 | Sutcliffe et al. |
| 5,062,507 | A | 11/1991 | Roche |
| 5,149,066 | A | 9/1992 | Snaith et al. |
| 5,169,110 | A | 12/1992 | Snaith et al. |
| 5,218,728 | A | 6/1993 | Lloyd et al. |
| 5,257,680 | A | 11/1993 | Corcoran et al. |
| 5,375,879 | A | 12/1994 | Williams et al. |
| 5,638,560 | A | 6/1997 | Rigdon et al. |
| 5,734,246 | A | 3/1998 | Falangas |
| 6,202,492 | B1 | 3/2001 | Ohsaki et al. |
| 6,231,114 | B1 * | 5/2001 | Warmoth ............... A47C 17/80 5/118 |
| 6,547,205 | B2 | 4/2003 | Carter et al. |
| 6,588,554 | B2 | 7/2003 | Fujita et al. |
| 6,631,526 | B1 | 10/2003 | Enright |
| 6,695,799 | B2 | 2/2004 | Kitadou et al. |
| 6,997,515 | B2 | 2/2006 | Gupta et al. |
| 7,068,444 | B2 | 6/2006 | Nishi |
| 7,185,867 | B2 | 3/2007 | Hill et al. |
| 7,248,996 | B2 | 7/2007 | Uenishi et al. |
| 7,401,368 | B1 | 7/2008 | Saucedo |
| 7,489,987 | B2 | 2/2009 | Heiland et al. |
| 7,513,516 | B2 | 4/2009 | Ryan |
| 7,740,234 | B2 | 6/2010 | Robbins et al. |
| 7,983,813 | B2 | 7/2011 | Ummethala et al. |
| 8,095,268 | B2 | 1/2012 | Parison et al. |
| 8,162,299 | B2 | 4/2012 | Hiley et al. |
| 8,490,952 | B1 | 7/2013 | Vogel et al. |
| 8,548,678 | B2 | 10/2013 | Ummethala et al. |
| 8,598,591 | B2 * | 12/2013 | Umezaki ............... G09G 3/3266 349/44 |
| 8,655,554 | B2 | 2/2014 | Lin |
| 8,781,681 | B2 | 7/2014 | Parison et al. |
| 8,829,899 | B2 | 9/2014 | Polzer et al. |
| 8,888,185 | B2 | 11/2014 | Liao |
| 8,998,316 | B2 | 4/2015 | Naughton et al. |
| 9,043,721 | B2 | 5/2015 | Takenaka et al. |
| 9,053,585 | B2 | 6/2015 | Naylor |
| 9,072,387 | B2 | 7/2015 | Lobry et al. |
| 9,300,872 | B2 | 3/2016 | McClatchie |
| 9,353,824 | B2 | 5/2016 | Kraner et al. |
| 9,358,910 | B2 | 6/2016 | Howard |
| 9,416,844 | B2 | 8/2016 | Renard et al. |
| 9,463,805 | B2 | 10/2016 | Kirsch et al. |
| 9,500,489 | B1 | 11/2016 | Ng |
| 9,511,300 | B1 | 12/2016 | Huron |
| 9,629,471 | B2 | 4/2017 | VanHool et al. |
| 9,676,386 | B2 | 6/2017 | Remillard et al. |
| 9,702,349 | B2 | 7/2017 | Anderson et al. |
| 9,729,961 | B2 | 8/2017 | Howard et al. |
| 9,765,925 | B2 | 9/2017 | Lewis |
| 9,783,086 | B2 | 10/2017 | Parker et al. |
| 10,004,873 | B1 | 6/2018 | Hur et al. |
| 2001/0044959 | A1 * | 11/2001 | Davis .................... B60N 2/39 5/118 |
| 2002/0153467 | A1 | 10/2002 | Allen et al. |
| 2008/0230968 | A1 | 9/2008 | Kubo et al. |
| 2008/0258483 | A1 * | 10/2008 | Weber ................ B62D 33/0612 296/1.03 |
| 2009/0064808 | A1 | 3/2009 | Parison et al. |
| 2009/0236874 | A1 | 9/2009 | Ekberg et al. |
| 2010/0252712 | A1 | 11/2010 | Ha |
| 2012/0011657 | A1 | 1/2012 | Kovacs et al. |
| 2015/0045608 | A1 | 2/2015 | Karp et al. |
| 2017/0037926 | A1 | 2/2017 | Kronkright et al. |
| 2017/0136842 | A1 | 3/2017 | Anderson et al. |

OTHER PUBLICATIONS

Azizan, Mohd Amzar, "Characterization of the Influence of Vibrations on the Vehicle Occupant Drowsiness", PhD Thesis, RMIT University, School of Engineering, Apr. 12, 2016, 166 pgs.

Bayer, Laurence et al., "Rocking synchronizes brain waves during a short nap", Current Biology vol. 21, No. 12, 2011, pp. R461-R462.

Coffin, Spencer et al., "Defensive Surface Roadway Vibration Dampening Inertia Wave", Interactive Qualifying Project, Worcester Polytechnic Institute, May 1, 2012, 155 pgs.

Elgharib, Mohamed A. et al., "Video Magnification in Presence of Large Motions", Qatar Computing Research nstitute & MIT CSAIL, IEEE, 2015, 9 pgs.

Evers, Willem-Jan, "Improving driver comfort in commercial vehicles: modeling and control of a low-power active cabin suspension system", PhD Thesis, Technische Universitat Eindhoven, Jan. 1, 2010, 238 pgs.

Giacomin, Joseph A., "An Experimental Investigation of the Vibrational Comfort of Child Safety Seats", PhD Thesis, The University of Sheffield, Dept. of Mechanical Engieering, Dec. 1, 2012, 252 pgs.

Granlund, Johan, "Vehicle and Human Vibrationn due to Road Condition", Northern Periphery Programme EU, Jan. 1, 2013, 113 pgs.

Gutierrez, Guillermo, et al., "Respiratory rate variability in sleeping adults without obstructive sleep apnea", Physiological Reports ISSN 2051-817X, vol. 4, Iss. 17, 2016, 9 pgs.

Hanieh, Ahmed Abu, "Active Isolation and Damping of Vibrations via Stewart Platform", PhD Thesis, Universite Libre de Bruxelles, Active Structures Laboratory, Apr. 1, 2003, 155 pgs.

Kimura, Hitoshi et al., "Mechanical Bed for Investigating Sleep-Inducing Vibration", Hindawi Journal of Healthcare Engineering, vol. 2017, Article ID 2364659, Jul. 9, 2017, 9 pgs.

NASA, "Guidelines for Noise and Vibration Levels for the Space Station", Langley Research Center, NASA Contractor Report 178310, Jun. 1, 1987, 39 pgs.

Nato, "Backache and Back Discomfort", AGARD (Advisory Group for Aerospace Research & Development), Conference Proceedings No. 378, Aug. 26, 1986, 269 pgs.

Nirala, Chandrakant Kumar, "A Novel Semi-active Suspension System for Automobiles Using Jerk-Driven Damper", Master's Thesis, Indian Institute of Technology Hyderabad, Jul. 1, 2011, 65 pgs.

Omlin, Ximena et al., "Effect of Rocking Movements on Respiration", PLOS One, 11(3):e0150581, Mar. 8, 2016, 11 pgs.

Raemaekers, A.J.M, "Active vibration isolator design for ambulance patients", Mater's Thesis, University of Technology Eindhoven, Dept. of Mechanical Engineering, Jan. 1, 2009, 136 pgs.

Shirahatt, Anil et al., "Optimal Design fop Passenger Car Suspension for Ride and Road Holding", Journal of the Braz. Soc. of Mech. Sci. & Eng.—Copyright ABCM, vol. XXX, No. 1, Jan.-Mar. 2008, pp. 66-76.

Zavrel, Erik A. et al., "A Novel Two-Degree-of-Freedom Mechatronic Bed for Insomnia Treatment", Dept. of Biomedical Eng. Cornell

(56) References Cited

OTHER PUBLICATIONS

University, Proceedings of the 2017 Design of Medical Devices Conference, ASME, Apr. 10-13, 2017, Minneapolis, MN, 2 pgs.

* cited by examiner

BERTH APPARATUS AND METHODS USING PHYSIOLOGICAL PARAMETERS FOR CONTROLLING BERTH MOTION TO PROMOTE RELAXATION AND TO INDUCE SLEEP

FIELD OF THE INVENTION

The present invention relates generally to sleeper berths mounted on secondary suspensions inside vehicles to promote relaxation and to induce sleep in recumbent passengers through appropriate management of undesirable motion caused by vibrations and through delivery of a desired motion that is based on a physiological parameter of the passenger.

BACKGROUND OF THE INVENTION

Vehicles travelling on roads, as well as marine vehicles and aircraft, expose their human occupants to various types of mechanical vibrations. The amplitude, energy and frequency of these vibrations affect the state of the passengers as well as that of the driver. The prior art contains many teachings spanning a period of over 100 years on the mechanics of suspensions and vibration dampers to counteract undesirable or unwanted motion caused by such vibrations. These prior teachings typically focus on the primary suspension of the vehicle and its active, semi-passive and passive elements. In particular, the prior art presents various types of controls, springs, shocks, struts, pneumatics, fluidics and still other approaches to improve primary suspensions in vehicles.

The prior art also teaches various types of force damping isolators made of resilient elements. One interesting class of such isolators includes coiled springs made of steel cable also known as wire-rope isolators. Several forms of such isolators are found in U.S. Published Application No. 2010/0252712 to Ha; U.S. Pat. No. 5,169,110 to Snaith et al.; U.S. Pat. No. 5,062,507 to Roche; and in U.S. Pat. No. 4,783,038 to Gilbert et al.

Despite clear progress in the design of primary suspensions the problem of vibrations has not been solved, but just mitigated to some extent. Having to thus contend with vibrations, their effects as encountered in vehicular travel were studied extensively in the past. Several of the studies paid special attention to conditions under which the passengers may suffer from the effects of such vibrations on their bodies. Such situations arise, for example, in ambulances and emergency medical care vehicles carrying injured passengers. Excellent overviews of the effect of vibrations and proposals for diminishing the transfer of road vibrations into an ambulance to a laying or recumbent patient is discussed by Coffin, Spencer et al., "Defensive Surface Roadway Vibration Dampening Inertia Wave", An Interactive Qualifying Project, Worcester Polytechnic Institute, May 2012 as well as by Raemaekers, A. J. M., "Active vibration isolator design for ambulance patients", Master's Thesis, Department of Mechanical Engineering and Dynamics and Control Group, Eindhoven University of Technology, January 2009. More general review of vibrations and their effects on the human body looking past road-bound vehicles to non-terrestrial ones is presented by NASA, "Guidelines for Noise and Vibration Levels for the Space Station", N87-24162 Committee on Hearing, Bioacoustics, and Biomechanics, National Research Council, Washington D.C., June 1987.

The effects of vibrations on drivers, their state of comfort and alertness or drowsiness have also been investigated. A review of the influence of vibrations on occupants of vehicles including drivers and their physiological response and alertness level is presented by Azizan, Mohd Amzar, "Characterization of the Influence of Vibrations on the Vehicle Occupant Drowsiness", PhD Thesis, School of Engineering, RMIT University, April 2016. Numerous prior art references teach secondary suspensions and other approaches to mitigate the impact of vibrations on drivers and sitting passengers. These solutions concentrate on the seated driver, or passenger, and the driver's seat construction and support in applying vibration isolation, damping and various active, semi-passive and passive measures.

Vibration mitigation and removal solutions that are applicable to upright and sitting passengers and drivers are not suitable for persons that are fully reclined or laying down. When it comes to passengers that are laying down in a vehicle, as in the case of passengers wishing to sleep or drivers taking a nap while their replacement is driving, different solutions are needed. To address the challenges of such recumbent passengers, the prior art contains various teachings dealing specifically with the mounting of suitable mechanisms to support a sleeping passenger in the fully reclined or laying down position. Beds, sleeper systems, suspensions and mattress supports in trucks, tractors and still other vehicles are discussed in detail by U.S. Pat. No. 7,401,368 to Saucedo; U.S. Pat. No. 6,631,526 to Enright; U.S. Pat. No. 5,638,560 to Ringdon et al.; U.S. Pat. No. 5,218,728 to Lloyd et al.; U.S. Pat. No. 4,977,631 to Bretz; U.S. Pat. No. 4,107,797 to Maxwell, Sr.; and by U.S. Pat. No. 3,882,558 to Christensen.

Given that vibrations affect passengers and articles in the vehicle differently, depending on their state, variable damping of vibrations in multiple degrees of freedom has also been a topic of interest. The teachings in U.S. Pat. No. 8,490,952 to Vogel et al. focus on minimizing the transmission of vibrations from an un-sprung mass object to a sprung mass object, i.e., from the wheeled carriage of the vehicle to its cabin. The damping is continuously variable within a certain range. The teachings of U.S. Pat. No. 9,463,805 to Kirsch et al. address systems and methods for dynamic vehicle control affecting sleep states of vehicle occupants. The solutions proposed are for passengers to promote relaxation and induce sleep by controlling the standard vehicle system according to the monitoring of physiological data from the passenger and in relation to the target sleep state.

Kirsch teaches monitoring the state of the vehicle occupant and making general adjustments to promote sleep, such as controlling seat positions, vehicle seat cushion settings, seat temperature, tactile stimulation, climate control, cabin lights, audio content and other infotainment. A related approach to inducing sleep in a passenger is taught in U.S. Pat. No. 10,004,873 to Hur et al. Hur teaches a sleep aid device for vehicle and a system including sleep aid devices with sleep-inducing start time and intra-vehicle device controls, including air conditioning and lights, as well as adjustment of routes; e.g., establishing a shortest-distance or shortest-time route to the destination when in a sleep mode to minimize inconvenience. Hur monitors tossing, turning, breathing and heartbeat of the user in his sleep aid device.

The prior art also teaches many approaches to promoting relaxation and inducing sleep in persons that are not inside moving vehicles. Notable studies on physiological parameters that promote relaxation and induce sleep have been conducted by Omlin, Ximena et al., "Effect of Rocking Movements on Respiration", PLoS ONE, 11(3), Mar. 8, 2016; Gutierrez, Guillermo et al., "Respiratory rate variability in sleeping adults without obstructive sleep apnea", Physiological Reports, 4(17), 2016; Zavrel, Erik A. et al., "A Novel Two-Degree-of-Freedom Mechatronic Bed for Insomnia Treatment", Proceedings of the 2017 Design of Medical Devices Conference, Minneapolis, Minnesota, Apr. 10-13, 2017; Bayer, Laurence et al., "Rocking synchronizes brain waves during short nap", Current Biology, 21(12), 2011; and Kimura, Hitoshi et al., "Mechanical Bed for Investigating Sleep-Inducing Vibration", Hindawi—Research Article, Journal of Healthcare Engineering, Vol. 2017, Article ID 2364659, 2017.

It is interesting to note that Kimura addresses a finding that jerk, i.e., the time rate of change in the acceleration of the bed, is a fundamental problem in disrupting and/or preventing sleep. Kimura studied this problem for jerk manifesting along the vertical direction as well as a horizontal direction. His results have shown that a certain magnitude of jerk (i.e., more than 0.2 m/s$^3$) disturbs sleep and that smooth vibration without jerking is required for a mechanical environment to induce sleep. Sleep inducing frequencies were found to reside at below about 2 Hz and above about 0.2 Hz, as suggested by research cited by Kimura (O'Hanlon et al.). Moreover, simple vibration of sinusoidal wave with large amplitude tends to cause motion sickness, irrespective of smoothness.

Despite the many approaches to both mitigating vibrations in vehicles and promoting relaxation and inducing sleep in general, the problem of efficiently and rapidly achieving these objectives has not been solved. More precisely, in practical applications where sleeping berths on secondary suspensions are deployed in a vehicle subject to vibration, there is no satisfactory approach to dealing with both vibration produced by the travel and any motion that may be helpful in inducing sleep or promoting relaxation in a recumbent passenger residing in the berth.

OBJECTS AND ADVANTAGES

In view of the shortcomings of the prior art, it is an object of the present invention to provide for a berth apparatus and methods in sleeping berths mounted on secondary suspensions to promote relaxation and induce sleep in recumbent passengers that occupy them.

It is a further object of the invention to provide a motion management approach that addresses both vibrations that produce undesirable motion and to impart to the berth desirable motion that is based on a physiological parameter of the passenger to promote relaxation and to induce sleep. More specifically, the inhalation cycle or breathing cycle is to be used as one possible physiological parameter for determining the desirable motion to be applied to the berth.

Still other objects and advantages of the invention will become apparent upon reading the detailed specification and reviewing the accompanying drawing figures.

SUMMARY OF THE INVENTION

The objects and advantages of the invention are provided by a berth apparatus with a berth designed to accommodate a recumbent passenger lying on their side, supine or prone and to promote relaxation and/or induce sleep in such recumbent passenger. The berth apparatus is mounted in a vehicle, such as a terrestrial vehicle, a marine vehicle or an aircraft. The apparatus has a secondary suspension that supports the berth in proper position and orientation to comfortably accommodate the recumbent passenger. Further, the berth apparatus has a vibration detection system designed to detect any unwanted motion executed by the berth when the vehicle is stationary or moving. All six degrees of rigid body motion possible in three-dimensional space, i.e., linear displacements along the X, Y, Z axes and three orthogonal rotations known as roll, pitch and yaw ($\varphi$, $\theta$, $\psi$) can be monitored by the vibration detection system. However, at the very least one degree of freedom such as linear motion along the vertical direction (assigned to the Z axis herein) is monitored to detect unwanted motion. In the case of the Z axis, this is unwanted up and down motion that is particularly jarring to a recumbent passenger. Such unwanted motion is most commonly created when driving over bumps in the road.

The berth apparatus has a motion management system that is integral to and works together with the secondary suspension. The motion management system has a motion removing component for removing from the berth the unwanted motion detected in the at least one degree of freedom monitored by the vibration detection system. When all six degrees of freedom (x, y, z, $\varphi$, $\theta$, $\psi$) are monitored the motion management system may use the motion removing component for removing from the berth the unwanted motion detected in all of these six degrees of freedom.

Preferably, when only one degree of freedom is selected for monitoring and removal of unwanted motion, then this degree of freedom should be chosen along the Z-axis extending in the vertical direction. The motion management system is further equipped with a motion adding component that adds to the berth a desirable motion in the at least one degree of freedom that has been chosen, e.g., along the Z-axis. The desirable motion has a low frequency and small amplitude as perceived by the recumbent passenger. The actual low frequency and small amplitude of the desired motion is based on a physiological parameter of the recumbent passenger.

In a preferred embodiment, the physiological parameter is the breathing or inhalation cycle of the recumbent passenger in his or her instantaneous state, e.g., attentive, relaxing or sleeping. The desirable motion is a relaxation-promoting motion and even more preferably a sleep-inducing motion. To achieve the intended effect, the frequency of desirable motion is related to the frequency of the inhalation cycle in the passenger's present state and the small amplitude ranges from imperceptible to slightly perceptible and on to fully perceptible. Specifically, the small amplitude is preferably contained in a range between about 4 mm and about 40 mm. The sleep-inducing or relaxation-promoting motion can be actively adjusted by the motion management system as the state of the recumbent passenger changes, e.g., from very alert to drowsy. Of course, the sleep-inducing or relaxation-promoting motion can also be adjusted by the passenger.

In some embodiments the motion management system may include a filter for passing components of motion of the vehicle that are in the range of the desirable motion to the berth. This may happen especially in situations when the vehicle itself is already in motion rather than stationary (e.g., parked or re-fueling). The vibration detection system triggers from the velocity of the berth relative to the moving frame of the vehicle. For this purpose, it has a first accelerometer that is mounted on the vehicle or the part of the berth apparatus attached to the vehicle to measure the vehicle's state of motion. A second accelerometer is mounted on the berth that is supported on the secondary suspension and on which the passenger is laying down to determine the berth's state of motion. Integration of the signals from the two accelerometers enables the vibration detection system to derive the requisite signals.

In certain embodiments the motion management system has a vibration transfer element to further facilitate handling of undesirable motion and/or aid in the addition of desirable motion. These embodiments typically involve two or more degrees of freedom. At the very least, the two degrees of freedom include horizontal displacement, e.g., along the Y-axis taken to be lateral and orthogonal to a direction of travel of the vehicle, and roll (defined by angle φ) about the X-axis taken to be along the direction of travel of the vehicle. In such embodiments the motion management system has a vibration transfer element for transferring a particular horizontal displacement or any of its components along the Y-axis to a correspondent roll (φ) about the X-axis. More preferably still, the embodiment includes management of five degrees of freedom that include the horizontal displacement along the Y-axis and roll (φ) about the X-axis as well as other degrees of freedom such as displacement along the X-axis. In fact, all six degrees of freedom may be monitored by a fully equipped vibration detection system and motion management system.

The motion management system may take advantage of any suitable combination of vibration isolation or management elements. These may include one or more passive vibration isolation elements, semi-passive vibration isolation elements and active vibration isolation elements. In some embodiments the motion management system deploys as its semi-passive vibration isolation element a spring configured to exhibit a small or even a zero spring constant K about an equilibrium or rest position of the berth. In the same or still another embodiment, the motion management system can deploy as one of its passive vibration isolation elements a wire-rope isolator.

The berth apparatus defines a certain range of allowable or tolerable mechanical movement or travel for the berth in the at least one degree of freedom that is being monitored and adjusted by removal of unwanted motion and addition of desirable motion. The range of travel in the at least one degree of freedom chosen is substantially larger than the small amplitude of desirable motion that may be added by the motion adding component of the motion management system. Furthermore, the berth apparatus has a motion limiting mechanism for limiting the range of travel of the berth. For example, the motion limiting mechanism can be embodied by a snubber that enforces a mechanical arrest at an end of the range of travel.

It is preferable for reasons of limited space in most vehicles in which the berth apparatus of the invention can be mounted to ensure that the berth has a compact footprint (along the X- and Y-axes) as well as a reduced vertical clearance (along the Z-axis). For example, a preferred reduced vertical clearance may be less than about 60 cm. Reduction in vertical clearance is important for stacking of multiple berths to accommodate a larger number of passengers in the vehicle. This approach is practicable even when the passengers are mature male or female humans. Of course, the passenger may not always be a human and may instead be embodied by, e.g., a domestic animal or a pet being transported by itself or in the company of its owner.

The invention extends to methods for accommodating a recumbent passenger in the berth apparatus mounted in the chosen vehicle. The method involves the step of providing a secondary suspension for reliably supporting a berth that is part of the berth apparatus and on which the passenger is to be accommodated. The method further calls for detecting any unwanted motion of the thus suspended berth in at least one degree of freedom as defined for rigid body motion and for managing the overall motion of the berth with the aid of the secondary suspension. Specifically, the motion of the berth is managed by removing from the berth's motion the unwanted motion in the at least one degree of freedom being supervised and adding to the berth a desirable motion. The desirable motion, also in the at least one degree of freedom being supervised or controlled, has a low frequency and a small amplitude based on a physiological parameter of the recumbent passenger.

Preferably, the physiological parameter relied upon is the inhalation cycle of the recumbent passenger and the desirable motion is a sleep-inducing motion. The low frequency is related to the inhalation cycle, e.g., it may be matched to the inhalation cycle and the pauses therein. The small amplitude is preferably contained between about 4 mm displacement, which may be imperceptible to some passengers (especially when the vehicle is in motion) and about 40 mm. The sleep-inducing motion can be actively adjusted by the motion management system with the state of the recumbent passenger or it may be adjusted by the passenger himself/herself. Likewise, the physiological parameter for imparting relaxation-promoting motion can be based on the inhalation cycle and the low frequency can be related to the inhalation cycle.

The present invention, including the preferred embodiment, will now be described in detail in the below detailed description with reference to the attached drawing figures.

BRIEF DESCRIPTION OF THE DRAWING FIGURES

Figure 2:
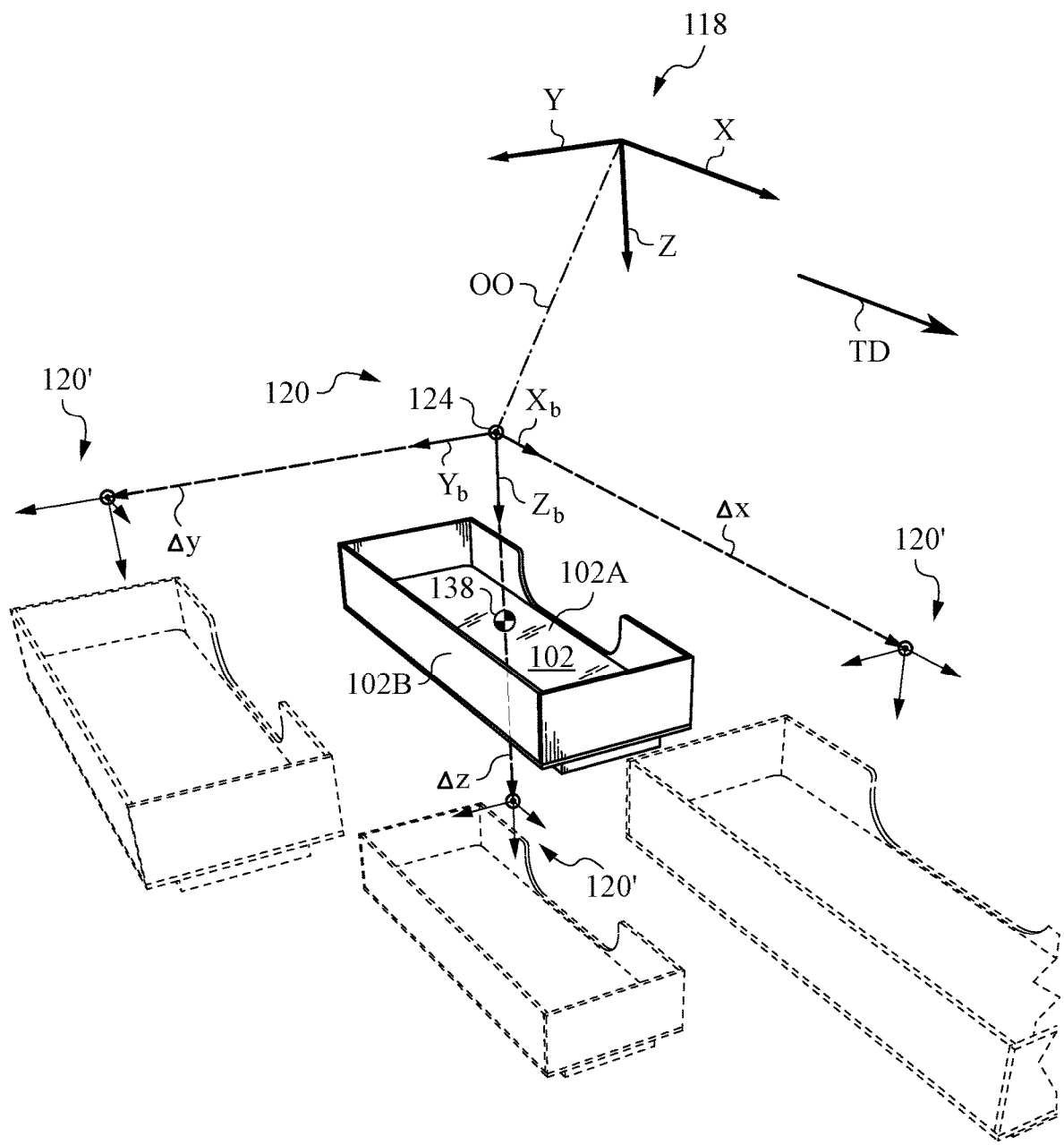

FIG. 1 is an isometric diagram of a vehicle with a berth apparatus having a berth for supporting a human passenger and further showing a coordinate convention used in describing the six degrees of freedom of rigid body motion FIG. 2 is a perspective view diagram showing the three possible translational degrees of freedom available to the berth belonging to the berth apparatus of FIG. 1

Figure 3A:
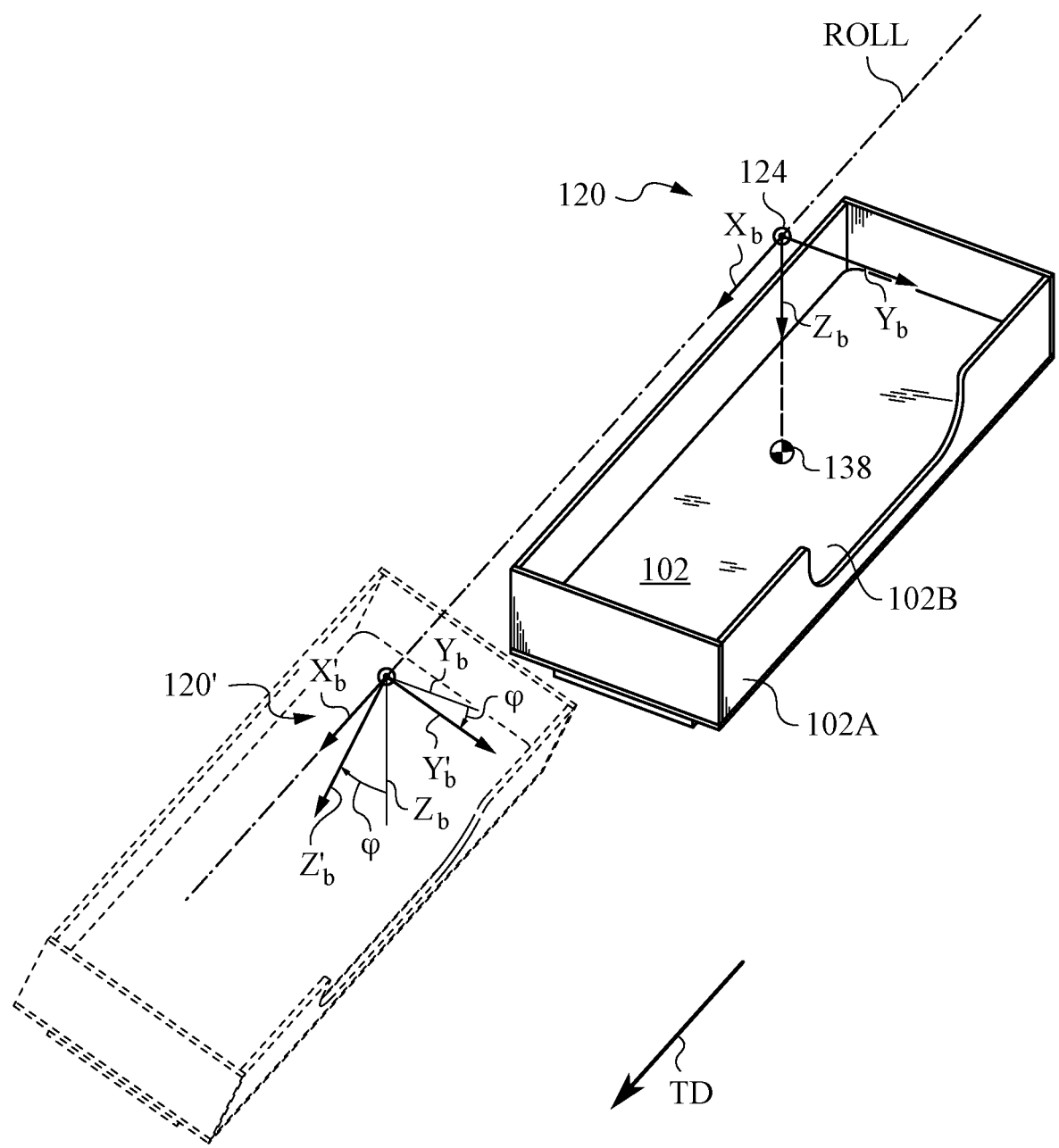
Figure 3B:
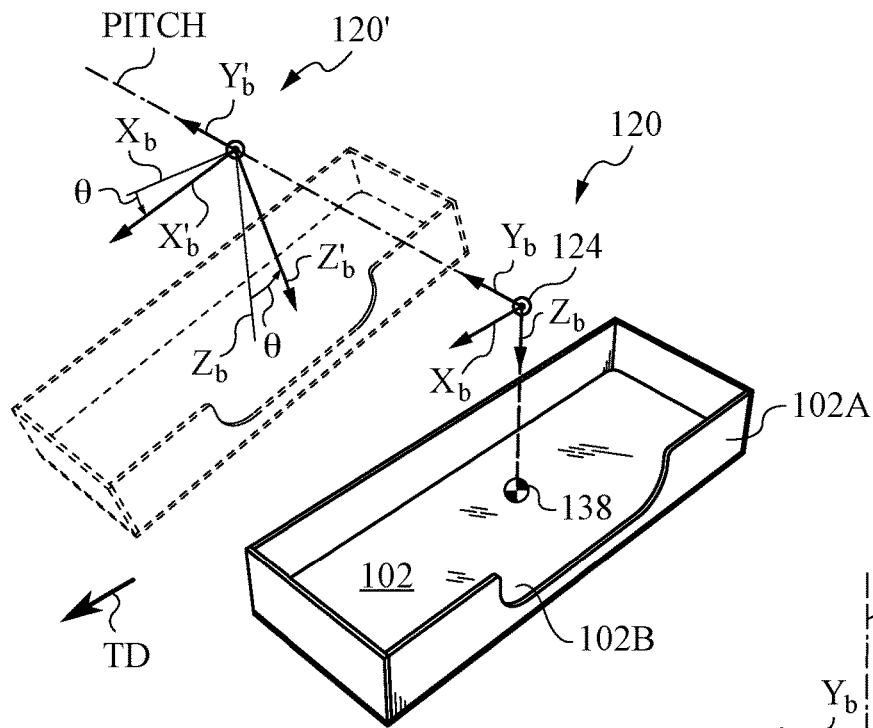
Figure 3C:
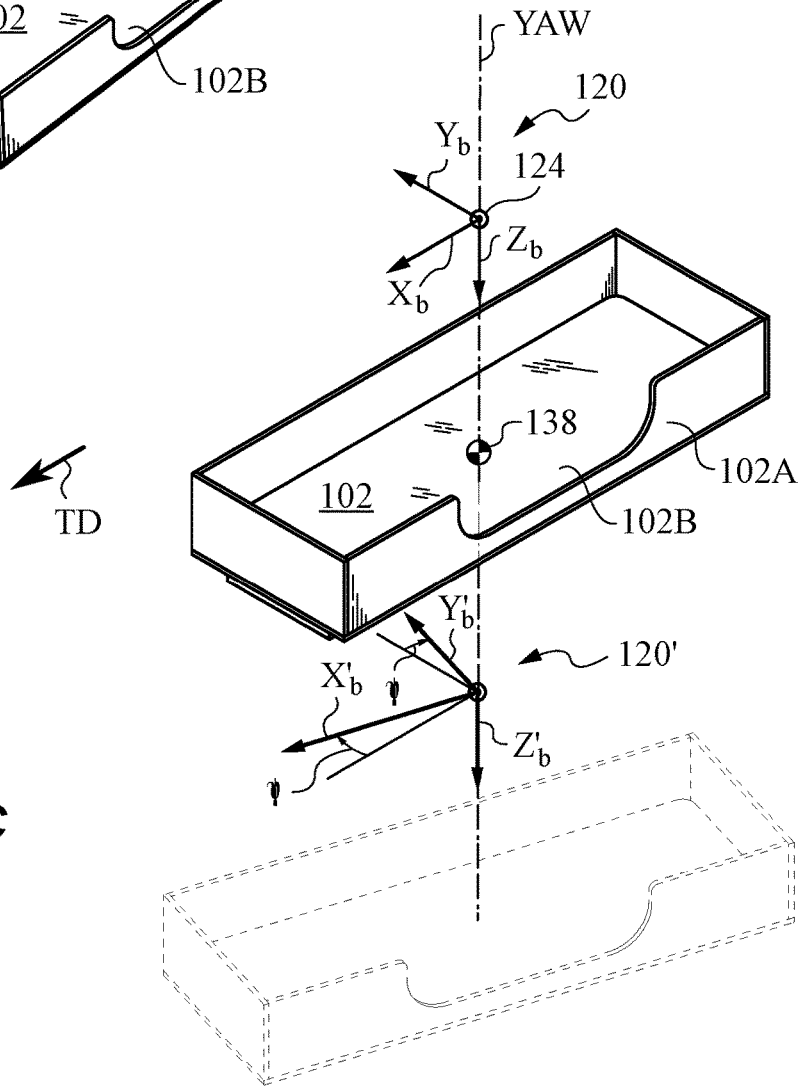

FIGS. 3A-C are isometric view diagrams showing the three possible rotational degrees of freedom available to the berth belonging to the berth apparatus of FIG. 1

Figure 4A:
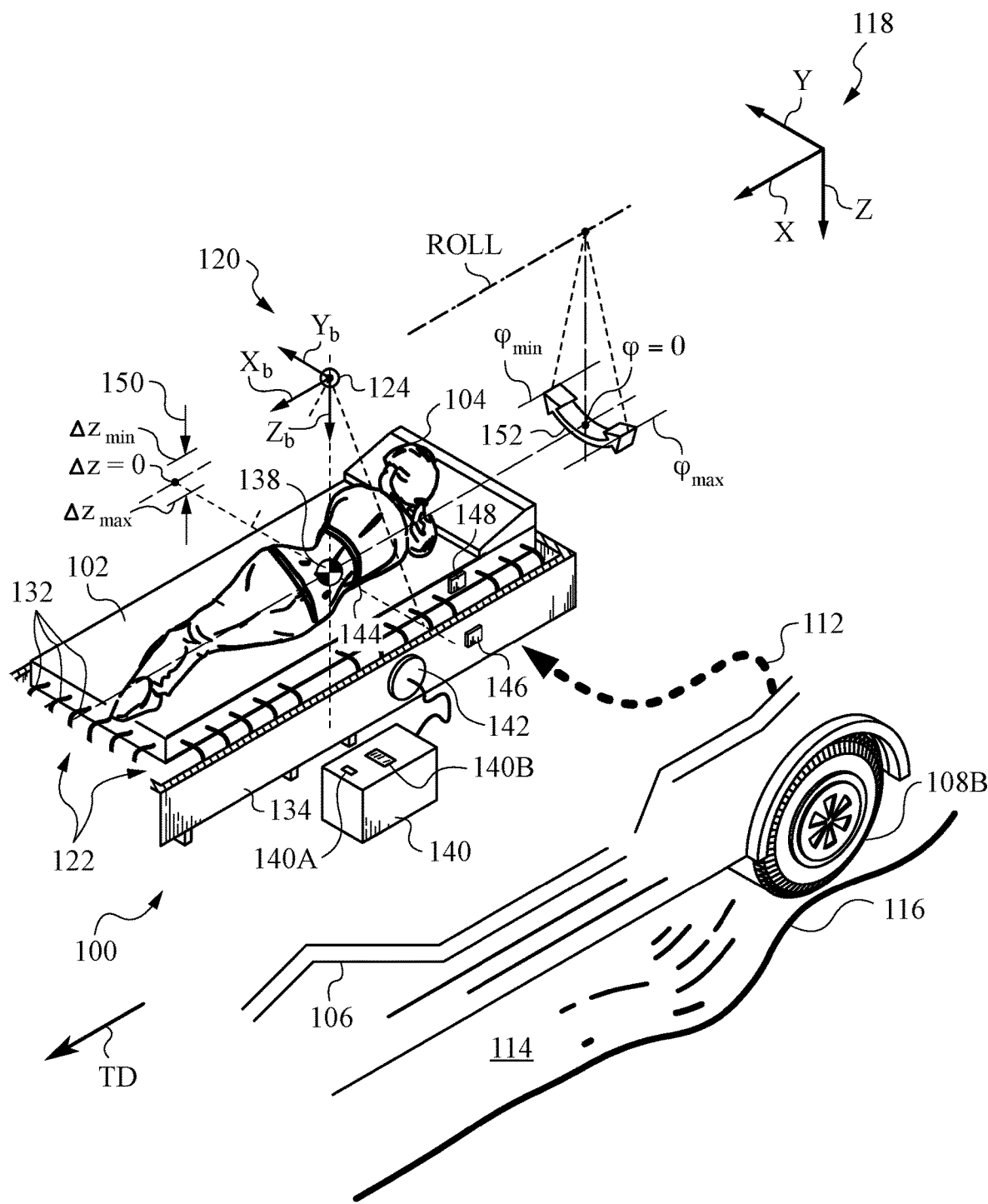
Figure 4B:
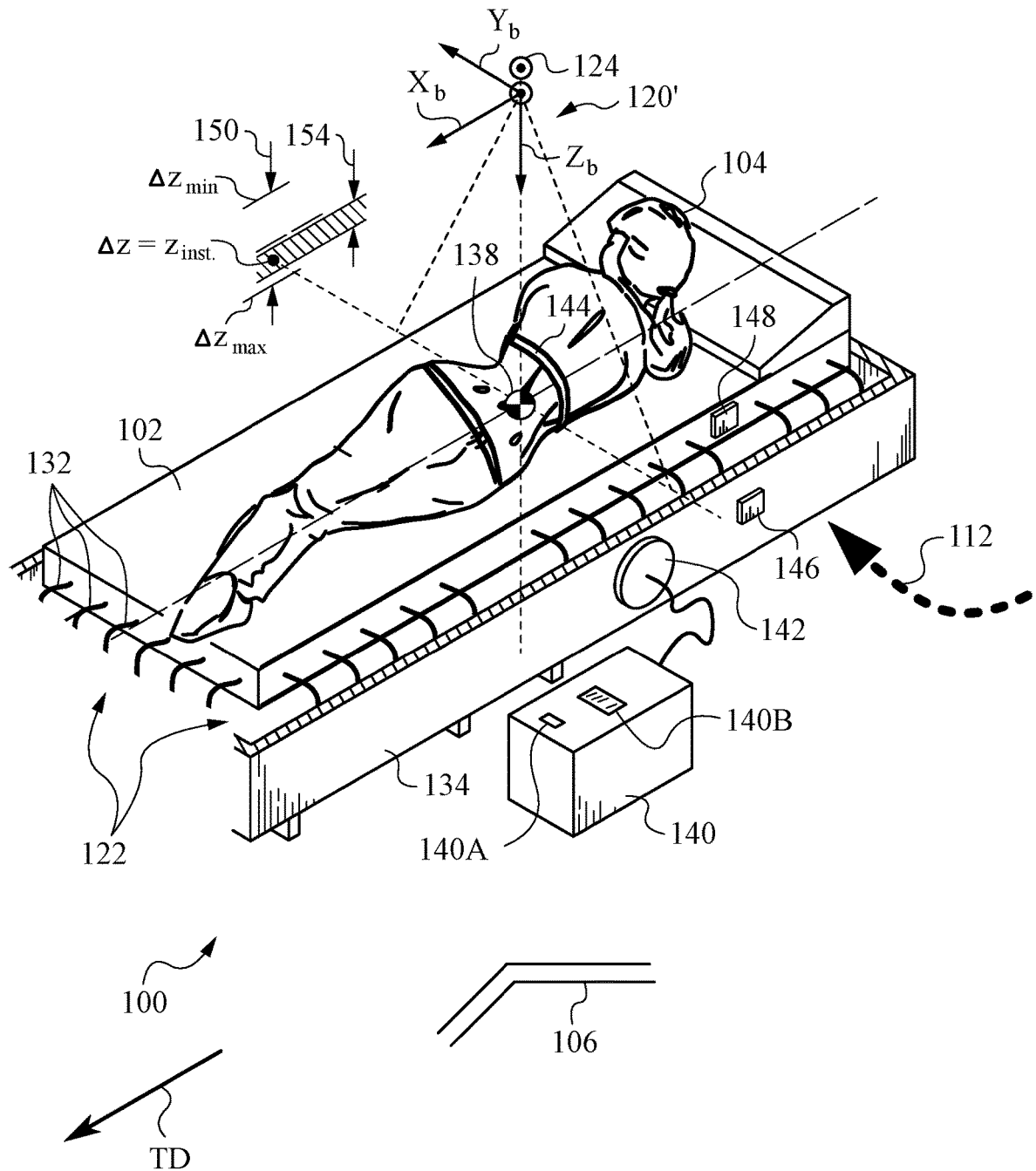
Figure 5:
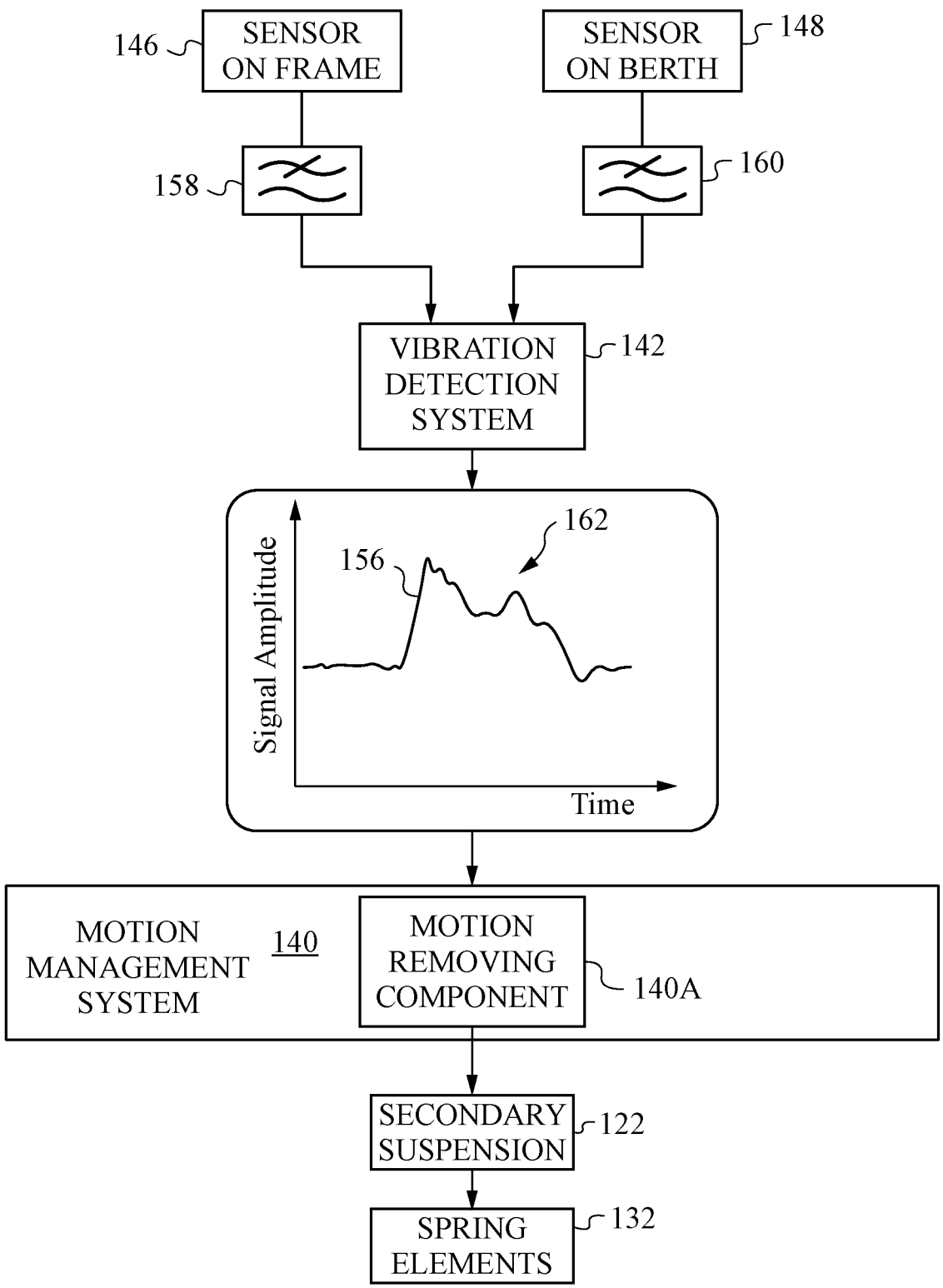
Figure 6A:
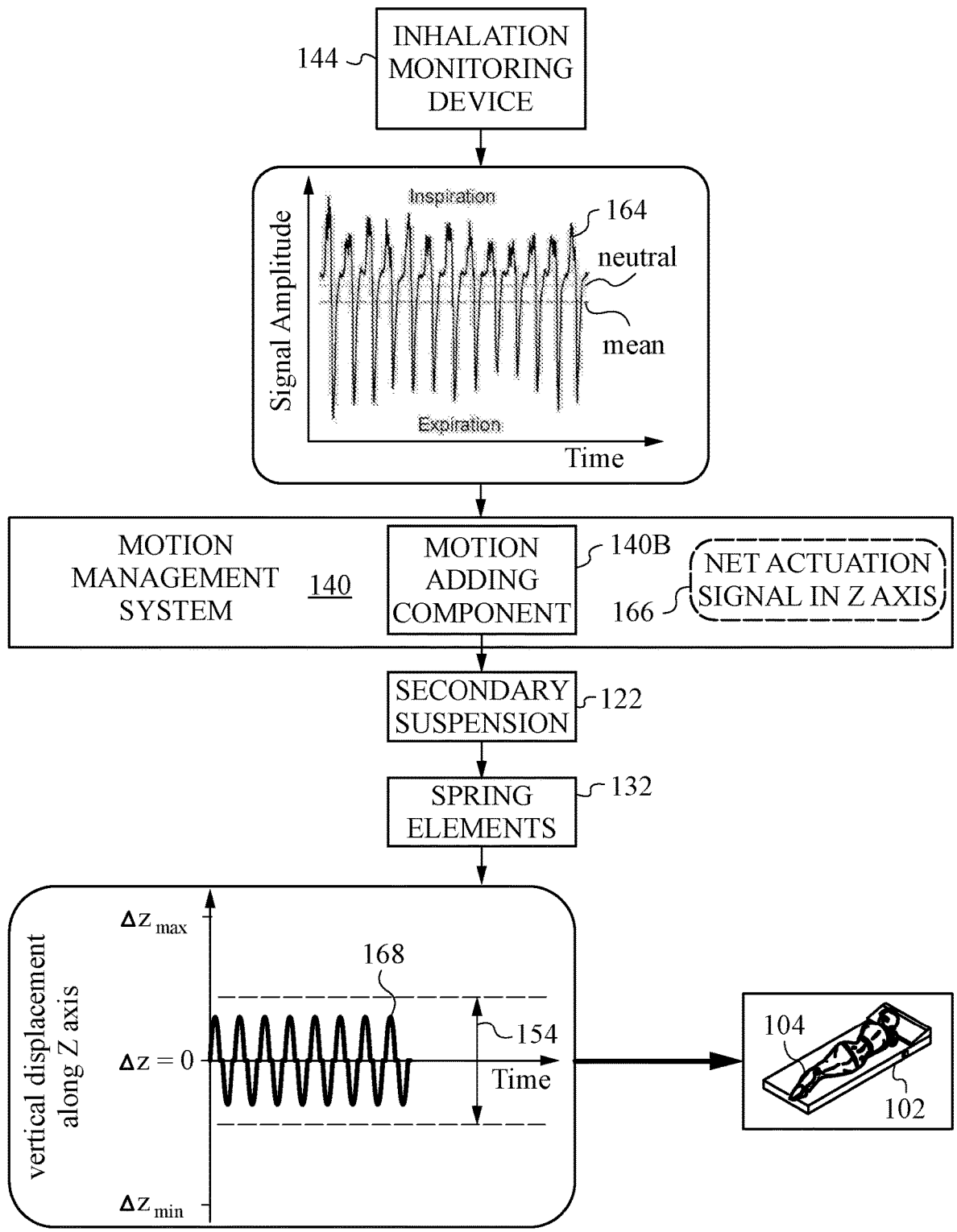
Figure 6B:
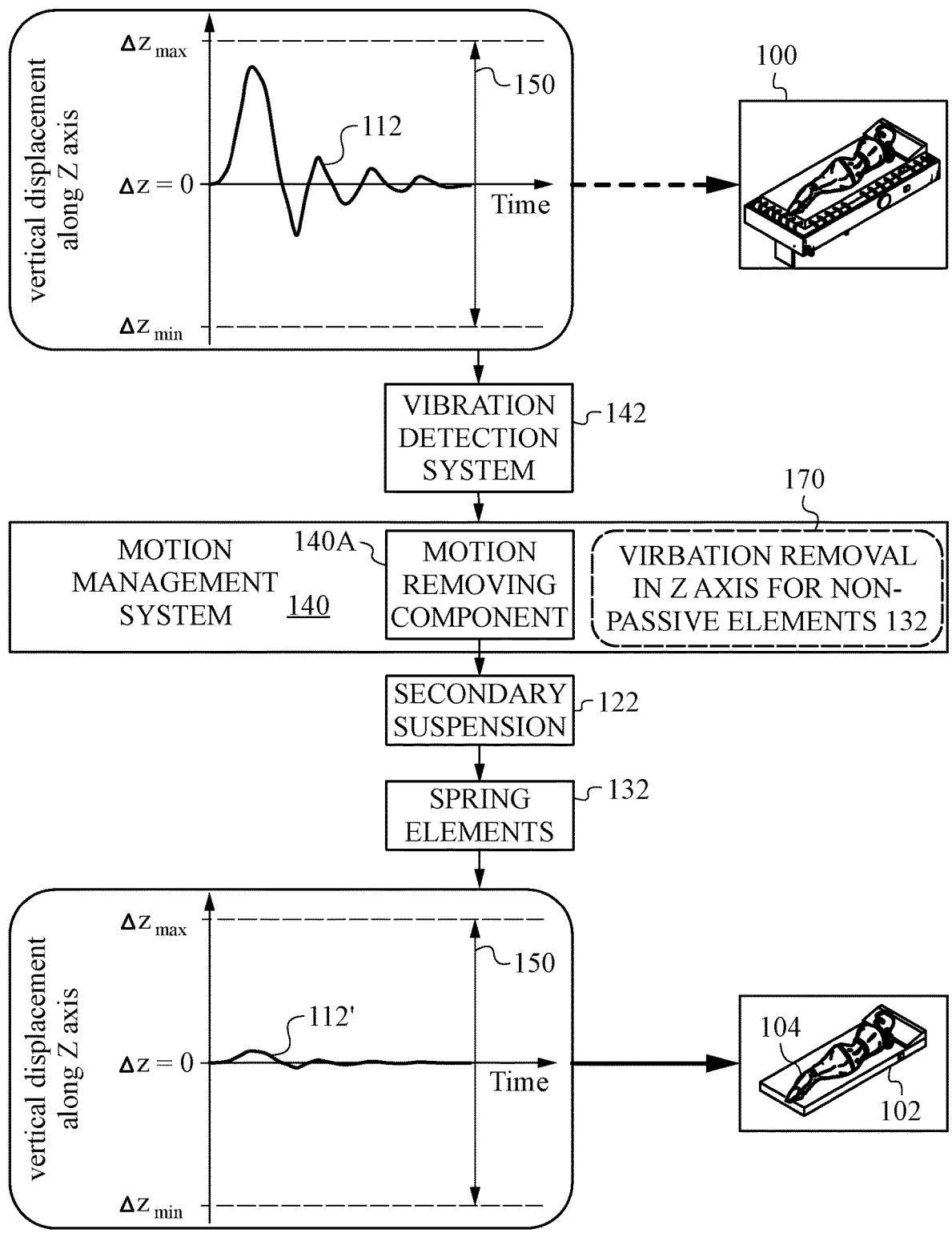
Figure 7:
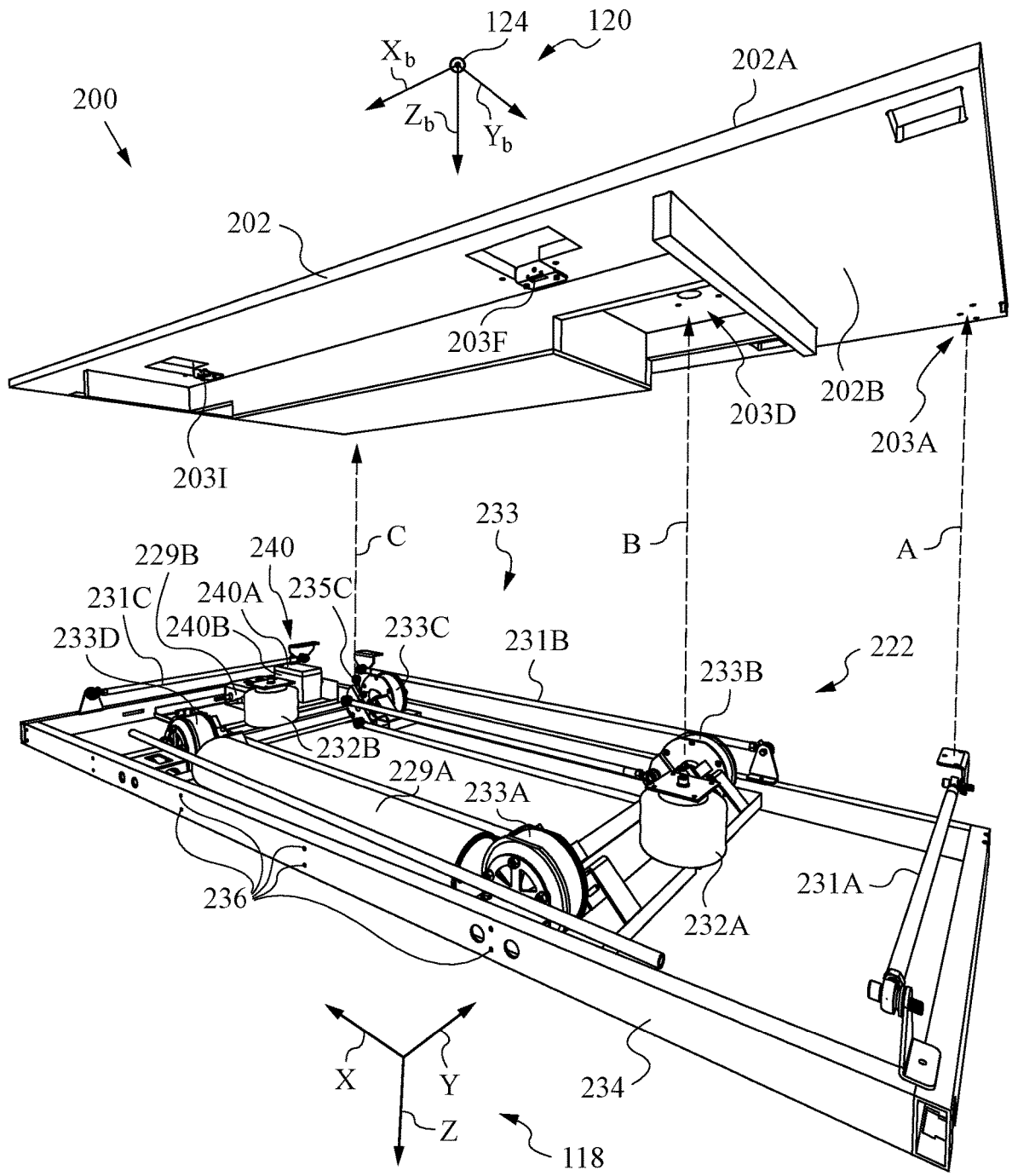
Figure 8:
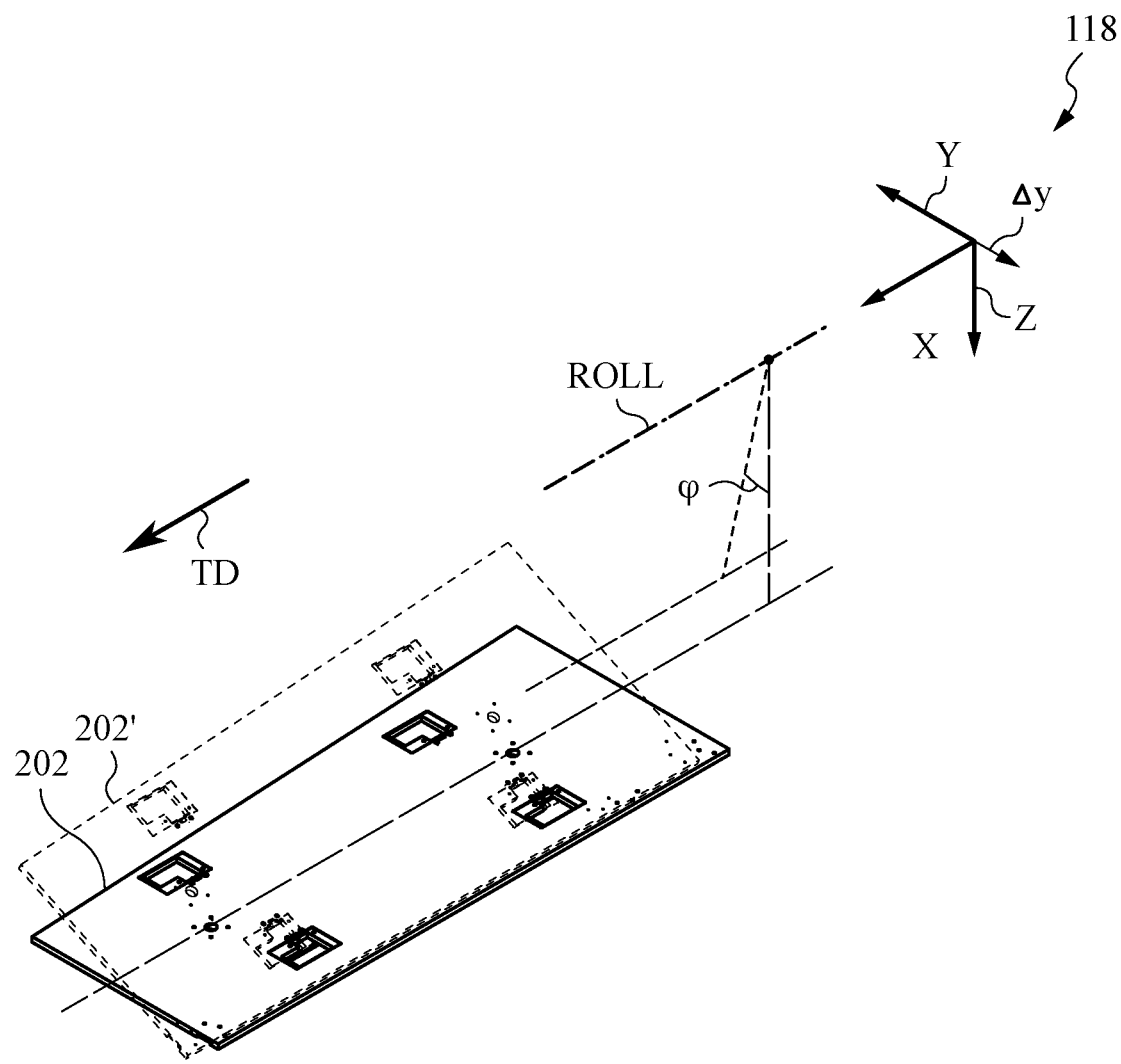

FIG. 4A is an isometric diagram showing the recumbent human passenger on the berth belonging to the berth apparatus of FIG. 1 in the equilibrium pose FIG. 4B is an isometric diagram showing the recumbent human passenger on the berth belonging to the berth apparatus of FIG. 1 with a vertical displacement along the Z axis FIG. 5 is a diagram illustrating the generation of a trigger signal by a vibration detection system FIG. 6A is a block diagram showing the operation of a motion adding component of a motion management system FIG. 6B is a block diagram showing the operation of a motion removing component of a motion management system FIG. 7 is an exploded perspective view of a berth apparatus according to the invention FIG. 8 is a schematic diagram illustrating the operation of a vibration transfer element of a motion management system of the berth apparatus of FIG. 7

Figure 9A:
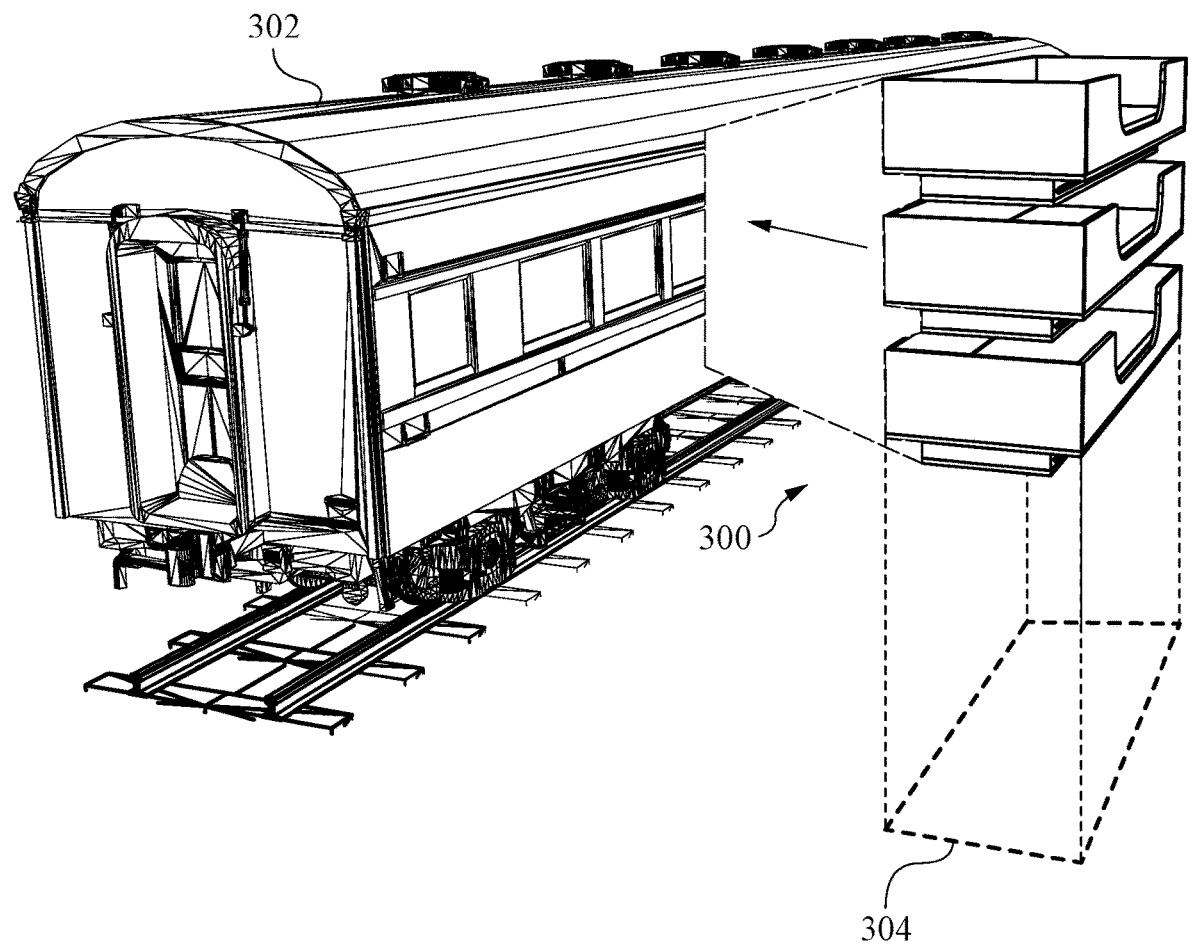
Figure 9B:
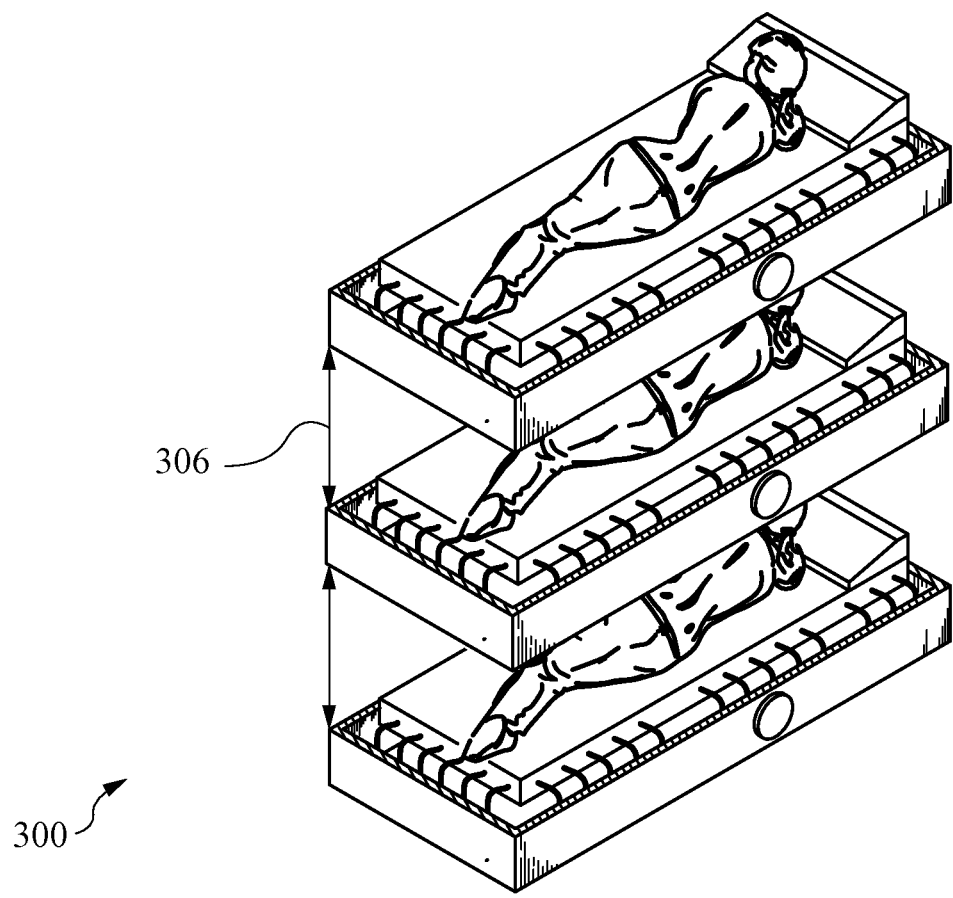
Figure 10A:
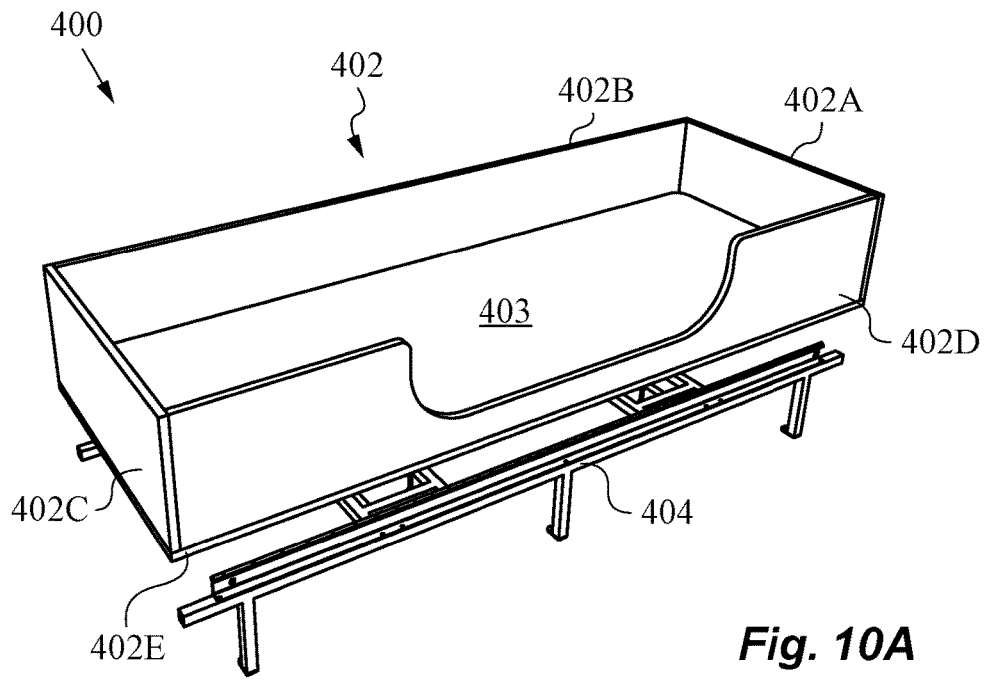
Figure 10B:
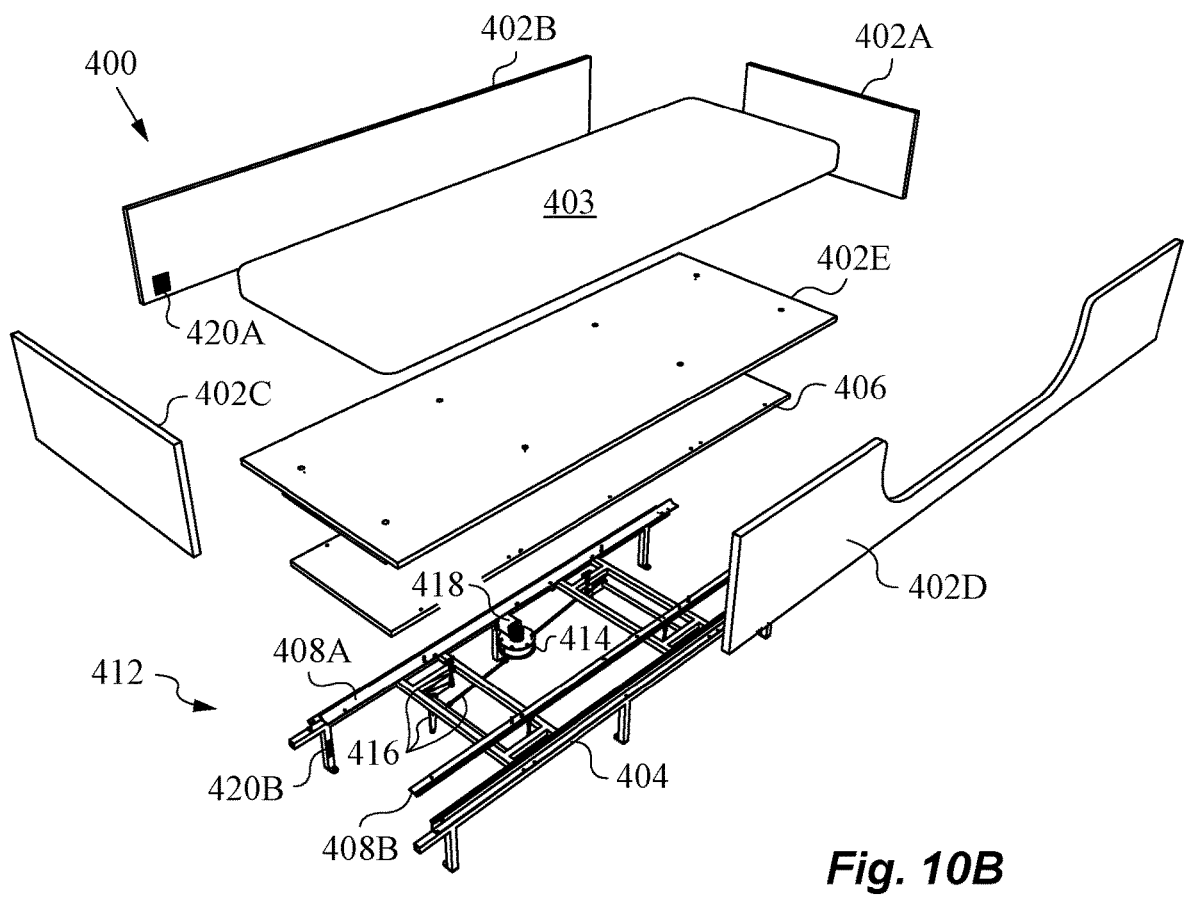
Figure 10C:
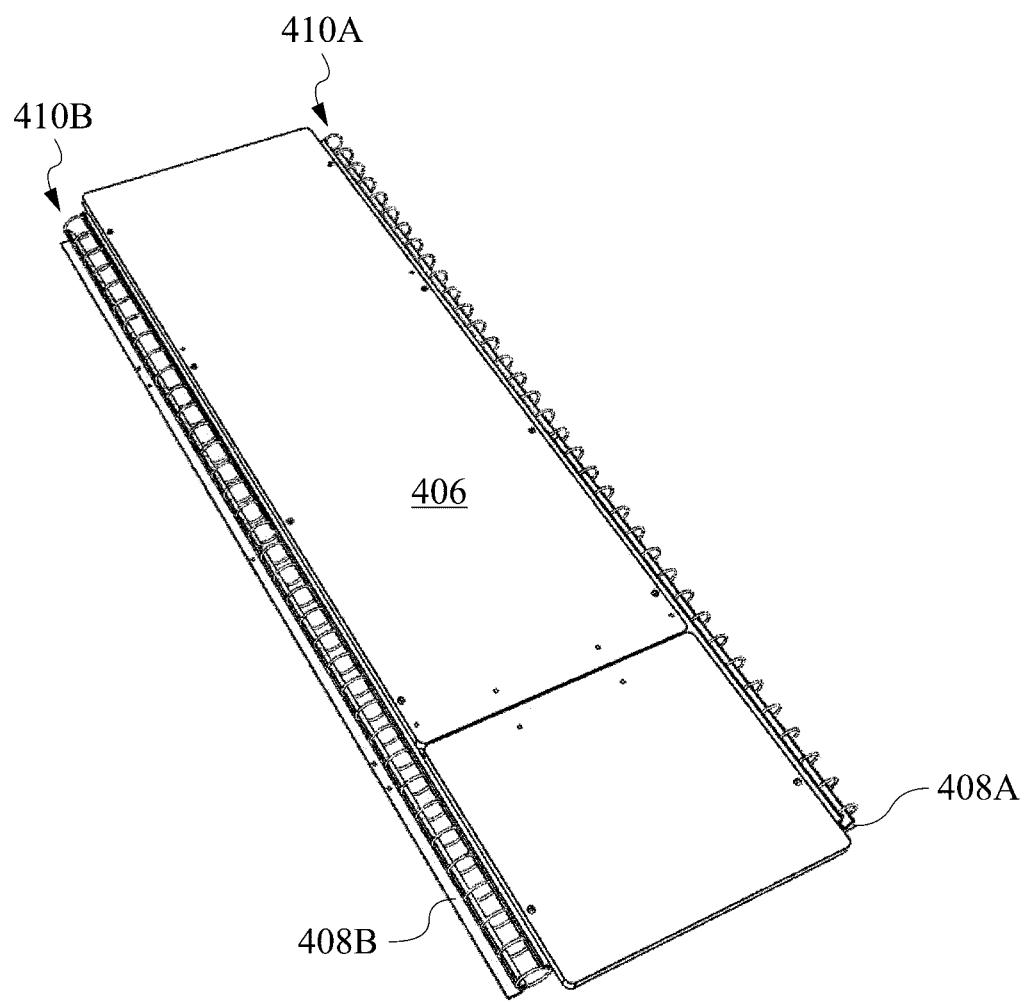
Figure 11A:
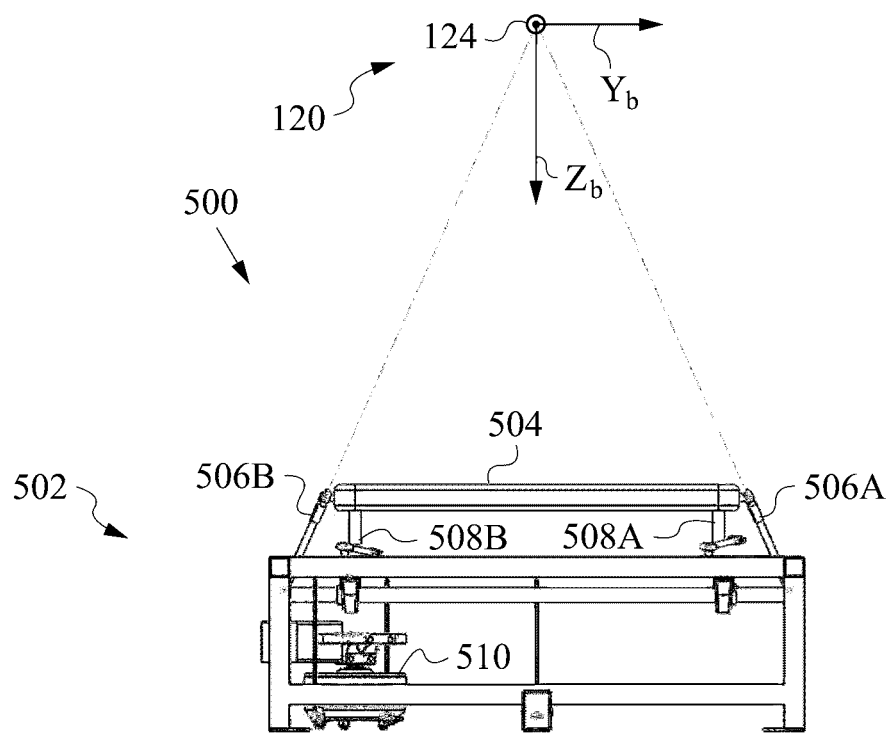

FIG. 9A is a perspective view showing an embodiment deploying berths in a stacked configuration on a train FIG. 9B is an isometric view showing the details of the compact stacking of berths in the embodiment of FIG. 9A FIG. 10A is a perspective view of another embodiment of a berth apparatus designed for operation in two degrees of freedom FIG. 10B is a perspective view of the berth apparatus of FIG. 10A in an exploded view illustrating its main components FIG. 10C is an isometric view illustrating the use of passive resilient elements embodied by wire-rope isolators to mount the berth belonging to the berth apparatus of FIG. 10A FIG. 11A is a front plan view of still another berth apparatus according to the invention in equilibrium pose (position and orientation).

Figure 11B:
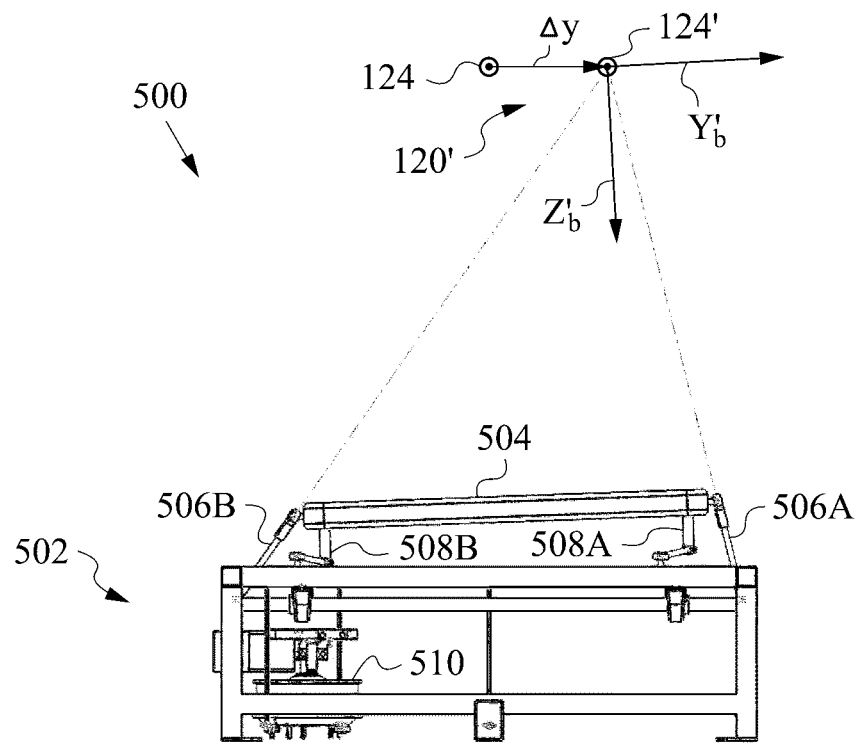

FIG. 11B is a front plan view of the berth apparatus of FIG. 11A displaced from the equilibrium position and rotated away from the equilibrium orientation.

DETAILED DESCRIPTION

The drawing figures and the following description relate to preferred embodiments of the present invention by way of illustration only. It should be noted that from the following discussion, alternative embodiments of the methods and systems disclosed herein will be readily recognized as viable options that may be employed without departing from the principles of the claimed invention. Likewise, the figures depict embodiments of the present invention for purposes of illustration only. One skilled in the art will readily recognize from the following description that alternative embodiments of the methods and systems illustrated herein may be employed without departing from the principles of the invention described herein.

The isometric diagram found in FIG. 1 shows an embodiment that elucidates several of the main aspects of the construction and operation of a berth apparatus 100 having a berth 102 for accommodating a recumbent passenger 104 thereon. Only the platform part of berth 102 is drawn without the enclosure or box, mattress and other common parts. This is done for reasons of clarity and to better show passenger 104 and several important aspects of the invention (see FIG. 2 & FIGS. 3A-C for a more complete view of berth 102). Passenger 104 is expected to be lying on their side, as shown, or else be supine or prone. The recumbent pose of passenger 104 is expected at most times, since, in accordance with the invention it is desirable to reduce the state of alertness of passenger 104 by promoting relaxation and/or inducing sleep in passenger 104 while in berth 102.

Berth apparatus 100 is installed or mounted in a vehicle 106 shown partially in a sectional and cut-away view. In the present example, vehicle 106 is embodied by a terrestrial vehicle such as a bus, a lorry, a truck or a car that travels on wheels 108. Only two wheels 108A, 108B of the commonly deployed four or more wheels 108 of vehicle 106 are shown in FIG. 1. Specifically, wheels 108A, 108B are the back wheels of vehicle 106 joined by an axle 110.

During travel, back wheels 108A, 108B roll on a surface 114, in the present exemplary embodiment a highway, a road or a street to enable vehicle 106 to travel along its direction of travel indicated by an arrow TD. In general, road 114 will not be even, smooth, straight and flat. Indeed, road 114 will typically have turns and straight sections with bumps, depressions, holes, obstacles, cracks and other imperfections and road hazards, generally designated by reference 116. Travelling in vehicle 106 along road 114 with its curves and imperfections 116 induces various types of movements, jumps, swings and perturbations all of which will collectively and generally be referred to herein as vibrations 112.

Vibrations 112 are transmitted via a primary vehicle suspension (not shown) to the frame of vehicle 106 and thereby to berth apparatus 100 that is attached to it. Vibrations 112 are further transmitted to berth 102. At present, we will not be concerned with aspects of the primary suspension of vehicle 106 such as its construction (e.g., coil springs) or performance. Thus, vibrations 112 are only indicated schematically by a thick and dashed arrow to show that vibrations 112 are transmitted to berth apparatus 100 and that they affect it.

For completeness, it should be noted that terrestrial vehicle 106 travels on the surface of planet Earth. In cases where vehicle 106 is not a car, bus or truck but a train or carriage travelling on rails or a vehicle that does not travel on Earth's surface, the dynamics determining how vibrations 112 are produced and transmitted to berth apparatus 100 will differ. Nevertheless, a person skilled in the art will recognize how to adapt the present exemplary embodiments to such cases.

The diagram in FIG. 1 also shows a Cartesian coordinate system 118 that will be used herein to help describe and parameterize the six degrees of freedom of rigid body motion in the frame of reference established by vehicle 106. Because the frame of reference established by coordinate system 118 is so central in the present teachings no subscripts are used to designate its axes X, Y, Z. Conveniently, the direction of travel TD of vehicle 106 is taken to be co-extensive with the positive X-axis of coordinate system 118. The Y-axis extends laterally and defines linear side-to-side movement. The Z-axis is aligned with the vertical and its positive direction is taken to point down. Defined in this manner, coordinate system 118 is right-handed. Of course, other coordinate systems and conventions may be used.

To properly describe the three degrees of translational freedom and the three degrees of rotational freedom that berth 102 experiences in the reference frame of vehicle 106 while suspended in berth apparatus 100 we introduce body coordinates 120 that parameterize berth 102. Note that body coordinates refer to berth 102 only, rather than to apparatus 100 that is attached to vehicle 106 and is thus properly described in the previously introduced vehicle coordinates 118. The Cartesian axes of body coordinates 120 have a subscript "b", hence $X_b$, $Y_b$ and $Z_b$ to distinguish them from axes X, Y, Z of vehicle coordinates 118 and/or any other coordinate systems that may be required, e.g., Earth's coordinates that parameterize its surface and road 114.

Berth apparatus 100 has a secondary suspension 122 for supporting berth 102 and recumbent passenger 104 thereon. Secondary suspension 122 is designed to keep berth 102 in a default or equilibrium position and orientation. When in this equilibrium position and orientation, sometimes jointly referred to as pose, body coordinates 120 parameterizing the position and orientation of berth 102 are centered at an origin 124 that is offset from the origin of vehicle coordinates 118. Depending on the mounting of berth 102, origin 124 is usually placed at a 'center of rotation' as explained further below. At the same time, axes $X_b$, $Y_b$ and $Z_b$ of body coordinates 120 are parallel to axes X, Y, Z of vehicle coordinates 118. The equilibrium position and orientation, or equilibrium pose is typically assumed by berth 102 when no external forces act on it.

The equilibrium pose may be adjusted, preferably when vehicle 106 is not moving, to ensure comfortable accommodation of recumbent passenger 104. For example, the vertical position along the Z-axis of berth 102 may be changed by recumbent passenger 104 to suit his or her preferences. A computer 126 belonging to berth apparatus 100 and equipped with requisite interface and input controls 128 is provided for receiving corresponding passenger input. Computer 126 may also have a screen 130 for displaying relaxation-promoting and/or sleep-inducing content to passenger 104. Computer 126 can also have other affordances such as speakers (not shown) for providing relaxation-promoting and/or sleep-inducing music. In alternative embodiments, computer 126 can cooperate with a smart phone or other passenger device and use the screen and other affordances of such phone or device instead.

In the present embodiment, secondary suspension 122 is embodied by sets of resilient elements or springs 132 that resiliently attach berth 102 to a mounting frame 134 of berth apparatus 100. Mounting frame 134 of berth apparatus 100 is itself attached to the frame of vehicle 106, as noted above to keep berth apparatus fixed in vehicle reference frame 118. The mechanical attachment between mounting frame 134 and vehicle 106 can be direct, or it may be accomplished with the aid of any suitable additional mechanical fixture(s) or elements 136, as shown in the present embodiment. In the equilibrium state, i.e., when no motion, perturbation or vibration 112 from travel on road 114 generates any forces that can be transferred to berth 102 via spring elements 132 of secondary suspension 122, berth apparatus 100 maintains the equilibrium pose (position and orientation) of berth 102. Differently put, at times when no forces act on berth 102, all six degrees of rigid body motion of berth 102 are maintained at their zero or default values with the aid of secondary suspension 122 and its spring elements 132.

Persons skilled in the art may consider the mass of vehicle 106 along with berth apparatus 100 but without berth 102 and passenger 104 as the un-sprung mass. Meanwhile, the mass of berth 102 along with recumbent passenger 104 thereon may be considered as the sprung mass. This is in close analogy to the primary suspension of vehicle 106. There the un-sprung mass consists of all parts that are not supported by the primary suspension, while the sprung mass includes all parts of vehicle 106 that are supported by the primary suspension, such as, e.g., the cabin.

Berth apparatus 100 also has a motion management system 140 that is integral to and works together with secondary suspension 122. System 140 has a motion removing component 140A for removing from berth 102 undesired or unwanted motion produced by vibrations 112. FIG. 1 illustrates motion removing component 140A schematically since it may include both software and hardware parts. In addition, motion management system 140 has a motion adding component 140B for adding to berth 102 a desirable motion. Once again, FIG. 1 illustrates motion adding component 140B schematically since it may include both software and hardware parts. The desirable and undesirable motions can occur in one or more of the three translational and three rotational degrees of freedom, depending on vibrations 112 and secondary suspension 122.

The desirable motion has to be low frequency and exhibit a small amplitude as perceived by recumbent passenger 104. In any embodiment, the actual low frequency and small amplitude of the desired motion added to the motion of berth 102 is based on a physiological parameter of recumbent passenger 104. Preferably, the physiological parameter is the inhalation cycle of passenger 104 in their present state of alertness. To measure the inhalation cycle, including the inspiration and expiration, berth apparatus 100 is equipped with an inhalation monitoring device 144. In the present embodiment, device 144 is a band that is worn by passenger 104 about their lower chest. The inhalation cycle of passenger 104 is reported by device 144 as a corresponding signal via any suitable communication link (not shown), including wired or wireless, to motion management system 140. System 140 communicates the signal representing the inhalation cycle either directly or after signal processing and/or conditioning to motion adding component 140B for use in generating the desirable motion having low frequency and small amplitude.

As will be appreciated by those skilled in the art, many other types of known inhalation monitors can be used to fulfill the function of inhalation monitoring device 144. Suitable devices include nasal inhalation meters, ear-plugs, wrist bands and other user-worn devices designed to monitor vital signs. This last group of devices includes smart watches and other personal devices that belong to passenger 104 and can be used to provide information they may inherently collect about his or her inhalation cycle to berth apparatus 100. For example, passenger 104 may synchronize such personal device to act as inhalation monitoring device 144 with computer 126 of berth apparatus 100. This task may be performed by using the affordances of computer 126 such as its controls 128 and screen 130. Computer 126 may then communicate the signal representing the inhalation cycle of passenger 104 via any suitable communication link (not shown) to motion management system 140 for use by motion adding component 140B.

In other alternative embodiments, external cameras, motion sensor or still other types of sensors can be used to monitor the inhalation cycle of passenger 104 in a contactless and remote manner. For example, video magnification may be used to monitor the pulse of passenger 104 and the related inhalation cycle while vehicle 106 is in motion and/or while passenger 104 is moving in berth 102. Teachings on video magnification suitable for such purposes are provided, for example, by Elgharib, Mohamed A. et al., "Video Magnification in the Presence of Large Motions", Qatar Computing Research Institute and MIT CSAIL, IEEE Conference on Computer Vision and Pattern Recognition, 2015 as well as the numerous references cited therein.

Further, berth apparatus 100 has a vibration detection system 142 designed to detect undesired or unwanted motion executed by berth 102 when vehicle 106 is either stationary or moving. Vibration detection system 142 is in communication with motion management system 140. In the present embodiment the communication occurs via a wired connection, but other communication links, including wireless channels can be used. All six degrees of rigid body motion or a subset of them can be monitored by the vibration detection system 142 and reported to motion management system 140.

In the present case, vibration detection system 142 has two sensing elements 146 and 148 attached to mounting frame 134 and to berth 102, respectively. Sensing elements 146, 148 can be embodied by inertial sensors, such as linear accelerometers and angular rate gyroscopes. Such devices can sense linear displacement along a single axis or along multiple axes, including translations along all three axes and rotations around all three axes. As will be appreciated by one skilled in the art, the exact choice of sensing elements 146, 148 depends on the degrees of freedom to be monitored by vibration detection system 142 and to be controlled by motion management system 140. Relative position between berth 102 and vehicle 106 can also be measured. This is commonly provided by the typical sensor(s) internal to the actuator(s) of motion management system 140.

In the present example embodiment, we examine displacement along the vertical or Z-axis because this is the most important degree of freedom to monitor and control. Hence, elements 146, 148 are uniaxial accelerometers placed near and approximately one above the other to sense linear displacements along the vertical or Z-axis. The communication links between accelerometers 146, 148 and system 142 to which they belong are not explicitly shown. In general, they can be wired or wireless. A person skilled in the art will be able to make the appropriate choice of communication link depending on bandwidth, power and other important operating requirements.

To better explain the undesirable motion that is experienced by berth 102 during travel of vehicle 106 on road 114, it is important to see how this undesirable motion is partitioned among the six degrees of freedom that it affects. Undesirable motion in some of these degrees of freedom is much more problematic that in others. Thus, it is important to formally introduce the six degrees of freedom of rigid body motion available to berth 102. After reviewing them, we will return to the details and operation of motion management system 140 as well as vibration detection system 142.

To explain the first three linear or translational degrees of freedom, FIG. 2 shows a more complete view of berth 102 with its mattress 102A on top of the berth platform and berth enclosure 102B enclosing both. Passenger 104 is left out in FIG. 2 for reasons of clarity. The axes $X_b$, $Y_b$, $Z_b$ of body coordinates 120 are oriented parallel with axes X, Y, Z of coordinate system 118 of vehicle 106 (see FIG. 1). However, the origins of vehicle coordinates 118 and body coordinates 120 of berth 102 are offset, as previously mentioned. FIG. 2 visualizes the offset more formally as an origin offset $\infty$ in a dashed and dotted line. As also mentioned above, origin 124 of body coordinates 120 is located at the center of rotation defined by the mechanical construction of secondary suspension 122. In some embodiments, the rotation point is the instantaneous center of rotation commencing from the equilibrium pose based on the geometry imposed by the mechanics of secondary suspension 122. The details of a preferred construction and its geometry of secondary suspension 122 are discussed further below.

Origin 124 of body coordinates 120 in equilibrium pose is located directly above a center of mass 138 of berth 102 with recumbent passenger 104 lying thereon (see FIG. 1). FIG. 2 shows just the center of mass 138 of the combined system including recumbent passenger 104 and berth 102. In the equilibrium pose all coordinate displacements or translations indicated by $\Delta x$, $\Delta y$ and $\Delta z$ with dashed vectors are zero. Although all translations $\Delta x$, $\Delta y$, $\Delta z$ as shown are positive, negative translations are obviously included. Now, absent rotations, displacements along X, Y, Z axes of vehicle coordinates 118 are equivalent to displacements along axes $X_b$, $Y_b$, $Z_b$ of body coordinates 120. Under these circumstances subscripts "b" can be left off displacements $\Delta x$, $\Delta y$ and $\Delta z$. For reasons of clarity and better reference, body coordinates 120 after undergoing translation are indicated with a prime as translated body coordinates 120'.

The three dashed versions of berth 102 shown in FIG. 2 illustrate its vastly exaggerated displacements $\Delta x$, $\Delta y$, $\Delta z$ along positive directions of axes X, Y, Z. In this manner, displacements $\Delta x$, $\Delta y$, $\Delta z$ provide measured values of the correspondent three linear or translational degrees of freedom of berth 102 as parameterized in vehicle coordinates 118. The forward/backward motion is along the X-axis, the right/left or side-to-side motion is along the Y-axis and the up/down motion is along the Z-axis. For positive displacements $\Delta x$, $\Delta y$, $\Delta z$ berth 102 moves to the left, forward and down in the present coordinate convention. These three displacements are shown individually in FIG. 2. Of course, positive and negative displacements in any combination are possible and may be imparted on berth 102 while vehicle 106 is travelling or is itself impacted by an external force (e.g., due to a collision). The most important translational degree of freedom for berth 102 from the point of view of the invention is vertical expressed by $\Delta z$ measured along the Z axis of vehicle coordinates 118.

The remaining three degrees of freedom for rigid body motion are rotations. In the present convention, these three rotational degrees of freedom are represented by roll, pitch and yaw. In FIG. 1 they are visualized individually and independently by corresponding rotation angles $\varphi$, $\theta$ and $\psi$ about the X, Y and Z axes of coordinate system 120, respectively.

FIGS. 3A-C show these three rotations in more detail using a similar visualization convention as employed in FIG. 2, by artificially offsetting berth 102 after rotation and drawing it in dashed lines. FIG. 3A illustrates rotation by roll angle $\varphi$ around the body axis $X_b$ of body coordinates 120 initially parallel with axis X of vehicle coordinates 118 (see FIG. 1). The default orientation of berth 102 is shown on the right. Body axis $X_b$ is extended with a double dashed and dotted line designated as ROLL, i.e., the rotation axis around which roll angle $\varphi$ is defined. The once rotated body coordinates 120' are indicated by a prime with primed axes as $X'_b$, $Y'_b$, $Z'_b$. Rotation by roll angle $\varphi$ keeps body axis $X_b$ the same, so $X_b$ and $X'_b$ remain collinear after the rotation and they extend along rotation axis ROLL.

Roll angle $\varphi$ is the rotation angle between original body axis $Y_b$ and primed axis $Y'_b$, as well as between original body axis $Z_b$ and primed axis $Z'_b$. Note that according to the right-handed rotation convention roll angle $\varphi$ is negative as shown in the example of FIG. 3A. The most important rotational degree of freedom for berth 102 from the point of view of the invention is roll about the direction of travel TD as expressed by $\varphi$ measured around rotation axis ROLL (or body axis $X_b$) initially parallel with the X axis of vehicle coordinates 118.

FIG. 3B illustrates rotation about body axis $Y_b$ of body coordinates 120 initially parallel with Y axis of vehicle coordinates 118 (see FIG. 1). The default orientation of berth 102 is shown on the right. Body axis $Y_b$ is extended with a double dashed and dotted line designated as PITCH to stand for the rotation axis around which pitch angle $\theta$ is defined. The once rotated body coordinates 120' are again primed, as are its body axes $X'_b$, $Y'_b$, $Z'_b$. Rotation by pitch angle $\theta$ keeps body axis $Y_b$ the same, and hence $Y_b$ and $Y'_b$ remain collinear under this rotation about rotation axis PITCH. Pitch angle $\theta$ is shown as the rotation angle between original body axis $X_b$ and primed body axis $X'_b$, as well as between original body axis $Z_b$ and primed body axis $Z'_b$. According to the right-handed rotation convention pitch angle $\theta$ is negative as shown in the example of FIG. 3B.

FIG. 3C illustrates rotation about body axis $Z_b$ of body coordinates 120 initially parallel with Z axis of vehicle coordinates 118 (see FIG. 1). The default orientation of berth 102 is shown on top. Body axis $Z_b$ is extended with double dashed and dotted line designated as YAW to stand for the rotation axis around which the yaw angle $\psi$ is defined. The once rotated body coordinates 120' are primed, as are the once rotated body axes $X'_b$, $Y'_b$, $Z'_b$. Rotation axis YAW extends from body axis $Z_b$ of still unrotated body coordinates 120 to once rotated body axis $Z'_b$. Yaw angle $\psi$ is the rotation angle between original body axis $X_b$ and primed axis $X'_b$, as well as between original body axis $Y_b$ and primed axis $Y'_b$. According to the right-handed rotation convention yaw angle $\psi$ is positive as shown in the example of FIG. 3C.

Unlike displacements, which are described by vectors or even scalars, the three rotations are described by rotation matrices $R(\varphi)$, $R(\theta)$ and $R(\psi)$. The full rotation matrix R is a composition of rotation matrices $R(\varphi)$, $R(\theta)$, $R(\psi)$ and accounts for all rotational degrees of freedom that a rigid body such as berth 102 described by body coordinates 120 can experience within vehicle coordinate system 118. The full rotation matrix R is obtained by multiplying the individual rotation matrices in a chosen rotation order convention. For the roll, pitch and yaw order the full rotation matrix R is thus: $R=R(\psi) \cdot R(\theta) \cdot R(\varphi)$ (rotation by roll angle $\varphi$ is applied first, and is hence the first matrix in the composition).

Berth 102 can move in any one or more of the six degrees of freedom or DOFs described above in any succession and/or combination. The instantaneous values of the DOFs, i.e., of the three displacements and three rotation angles, define the position of berth 102 in vehicle coordinates 118. The default or equilibrium positions and orientations, together defining the equilibrium pose, are all taken to be zero, i.e., $\Delta x=0$, $\Delta y=0$, $\Delta z=0$, $\psi=0$, $\theta=0$, $\psi=0$. The movements of berth 102 are described by time derivatives of the DOFs, here expressed in time derivatives of displacements $\Delta x$, $\Delta y$, $\Delta z$ and time derivatives of rotation angles $\psi$, $\theta$, $\varphi$.

The first order time derivatives, i.e., dx/dt, dy/dt, dz/dt and $d\theta/dt$, $d\theta/dt$, $d\varphi/dt$ describe the velocities of berth 102 in the corresponding degrees of freedom. These velocities in each of the DOFs are sometimes described with the dot convention as: $\dot{x},\dot{y},\dot{z},\dot{\psi},\dot{\theta},\dot{\varphi}$. Thus, constant linear motion without acceleration in the vertical degree of freedom along the Z axis is the value of $\dot{z}$ and constant rotation about the direction of travel DT (see FIG. 1) or about the X axis is the value of $\dot{\varphi}$. Second order time derivatives, i.e., $d^2x/dt^2$, $d^2y/dt^2$, $d^2z/dt^2$ and $d^2\psi/dt^2$, $d^2\theta/dt^2$, $d^2\psi/dt^2$, or $\ddot{x}$, $\ddot{y}$, $\ddot{z}$, $\ddot{\psi}$, $\ddot{\theta}$, $\ddot{\varphi}$ describe the accelerations of berth 102 in the corresponding degrees of freedom. A constant acceleration in the lateral direction perpendicular to the direction of travel DT or along the Y axis is the value of $\ddot{y}$ and a constant angular acceleration about the direction of travel DT or about the X axis is the value of $\ddot{\varphi}$.

The often neglected third order time derivatives, i.e., $d^3x/dt^3$, $d^3y/dt^3$, $d^3z/dt^3$ and $d^3\psi/dt^3$, $d^3\theta/dt^3$, $d^3\varphi/dt^3$ or $\dddot{x}$, $\dddot{y}$, $\dddot{z}$, $\dddot{\psi}$, $\dddot{\theta}$, $\dddot{\varphi}$ describe the changes in accelerations of berth 102 in the corresponding degrees of freedom. These are often called "jerks". A jerk in the degree of freedom mapped to the X axis that is coextensive with the direction of travel DT is the value of $\dddot{x}$. A jerk in the vertical direction is the value of $\dddot{z}$ and an angular jerk about the vertical axis Z is the value of $\dddot{\psi}$. In fact, it is the various and sudden jerks, especially in the linear degrees of freedom of berth 102 that are the most distressing to passenger 104 attempting to relax, fall asleep, or remain asleep.

FIG. 4A is an isometric diagram showing recumbent passenger 104 on berth 102 of FIG. 1 about to experience a distressing combination of motions or vibrations 112 due to vehicle 106 traveling over bump 116 in road 114. Specifically, FIG. 4A focuses on changes in the two most important degrees of freedom that need to be monitored and controlled to prevent disrupting the relaxation or sleep state of passenger 104. As already mentioned above, the first and most important is vertical displacement $\Delta z$ and specifically its changes measured by time derivatives along the Z axis, i.e., $\dot{z}$, $\ddot{z}$ and $\dddot{z}$.

In FIG. 4A berth 102 is shown maintained by secondary suspension 122 of berth apparatus 100 in the equilibrium or default pose. In other words, FIG. 4A illustrates the conditions just prior to vehicle 106 experiencing the perturbations or vibrations 112 due to going over road bump 116. In the equilibrium pose the body axes $X_b$, $Y_b$, $Z_b$ of body coordinates 120 are aligned with axes X, Y, Z of vehicle coordinates 118. Coordinates 118 and 120 are also offset from each other by origin offset $\infty$ previously shown in FIG. 2. Additionally, center of mass 138 is directly under point 124 taken as the center of rotation and the origin of body coordinates 120.

The equilibrium position along the Z axis at $\Delta z=0$ of berth 102 with recumbent passenger 104 is shown explicitly. The equilibrium value of rotation angle $\varphi=0$ about the X axis that is collinear with the corresponding rotation axis ROLL is also shown explicitly. The other four degrees of freedom are present and also subject to experiencing changes, but they will not be addressed in the present example.

A range of travel 150 in the vertical degree of freedom along the Z axis is also shown. The upper end of range of travel 150 indicated by a maximum value of displacement along the Z axis is referred to as $\Delta z_{max}$. The lower end of range of travel 150 indicated by a minimum value of displacement along the Z axis is referred to as $\Delta z_{min}$. (Recall that the value of z along the Z axis increases in the down direction and not up; hence the apparent reversal between $\Delta z_{max}$ and $\Delta z_{min}$ as illustrated in FIG. 4A). Although the equilibrium position along the Z axis at $\Delta z=0$ is illustrated half-way between $\Delta z_{max}$ and $\Delta z_{min}$, this is not a requirement. As previously noted, a position bias along the vertical may be added by motion management system 140 or by passenger 104 himself or herself. What is preferred, however, is that range of travel 150 be considerably larger than the small amplitude and low frequency desirable motion that can be imparted to berth 102 by motion adding component 140B. For example, travel range 150 can be 5 cm to 10 cm and even larger. Further, any bias applied to the position of berth 102 along the vertical should not place equilibrium position $\Delta z=0$ closer to either $\Delta z_{max}$ or $\Delta z_{min}$ than the magnitude of the small amplitude of the desirable motion, as explained in more detail below.

A range of travel or range of rotation 152 about the X axis (or, more strictly, about the $K_b$ axis) called roll and parameterized by rotation angle $\varphi$ is also shown. The upper end of range of rotation 152 indicated by a maximum value of roll $\varphi_{max}$. The lower end of range of rotation 152 indicated by a minimum value of roll $\varphi_{min}$. The equilibrium rotation at $\varphi=0$ is illustrated half-way between $\varphi_{max}$ and $\varphi_{min}$. Again, this is not a requirement. As previously indicated, a rotation bias in roll may be added by motion management system 140 or by passenger 104 himself or herself. What is preferred, however, that this be a very small bias, since passenger 104 is unlikely to find any appreciable departure from $\varphi=0$ very comfortable. The range of rotation 152 should also be considerably larger than the small amplitude and low frequency desirable motion that can be imparted to berth 102 by motion adding component 140B. For example, rotation range 152 can be 3 degrees to 7 degrees and even beyond. Further, any bias applied to the roll state of berth 102 should not place equilibrium roll $\varphi=0$ closer to either $\varphi_{max}$ or $\varphi_{min}$ than the magnitude of the small amplitude of the desirable motion, as explained in more detail below.

As vehicle 106 goes over bump 116 vibrations 112 are delivered to berth apparatus 100 that is attached to vehicle 106 by its frame 134. It is at this point that motion management system 140 in cooperation with secondary suspension 122 is designed to perform motion management that includes removal of undesired or unwanted motion of berth 102 with recumbent passenger 104 relaxing or sleeping thereon. To enable proper functioning, motion management system 140 uses the signals communicated to it from vibration detection system 142. These signals include a trigger signal indicating when motion management system 140 needs to deploy motion removing component 140A for removing from berth 102 unwanted motion produced by vibrations 112. Preferably, vibration detection system also communicates a magnitude and phase indicating the magnitude and temporal characteristics of the unwanted motion experienced by berth 102. To accomplish this, sensors 146 and 148 of vibration detection system 142 continuously report their measurements of linear and/or angular acceleration. In the present example, sensors 146, 148 are uniaxial, as explained above, and only provide a signal for vibrations 112 along the Z axis.

FIG. 4B illustrates in more detail the time at which vibrations 112 due to road bump 116 are transmitted to berth apparatus 100. At the instant shown, vertical displacement $\Delta z$ of berth 102 is no longer at equilibrium where $\Delta z = 0$. Instead, body coordinates 120 are vertically moved to translated body coordinates 120'. Vertical displacement is now $\Delta z = z_{inst.}$, where $z_{inst.}$ refers to the instantaneous value of vertical displacement of berth 102. At this value, a range of small amplitude 154 of desirable motion that is preferably contained between about 4 mm and about 40 mm is still entirely within travel range 150 of berth 102 on secondary suspension 122. A person skilled in the art may refer to this condition as not being "bottomed out".

The movement of berth 102 from equilibrium position $\Delta z = 0$ to $\Delta z = z_{inst.}$, when sufficiently abrupt, causes a large differential in the outputs of sensors 146 and 148. That is because sensor 146 is mounted on frame 134 of berth apparatus 100 by which it is attached to vehicle 106. Therefore, the signal from sensor 146 reports on the condition of vehicle 106 (the un-sprung mass). Meanwhile, sensor 148 mounted on berth 102 generates its signal based on the condition of berth 102 and recumbent passenger 104 supported by secondary suspension 122 (the sprung mass).

FIG. 5 is a diagram illustrating in more detail how the signals from sensors 146, 148 are processed and used by vibration detection system 142 to generate a trigger signal 156 for motion management system 140. Sensor 146 mounted on frame 134 passes its output signal through a low-pass rejection filter 158 to remove z-motion components whose frequencies are out of range. Similarly, sensor 148 mounted on berth 102 passes its output signal through a low-pass rejection filter 160 to also remove out-of-range z-motion components. The filtered signals are then passed to vibration detection system 142.

The signals from sensors 146 and 148 are clearly different. The first one reflects the z-motion of vehicle 106 and the second one reflects the z-motion of berth 102. Preferably, vibration detection system 142 takes a difference between these two signals to produce a joint differential signal 162. The amplitude of differential signal 162 is illustrated over a period of time starting before the event during which vehicle 106 drives over road bump 116 and ending after the event has transpired.

Differential signal 162 experiences a large change at the beginning of the event. In the present case the change is a marked increase in the amplitude of differential signal 162 from its noise-floor level above a trigger threshold. This increase in signal 162 is used as trigger signal 156 for motion management system 140. Trigger signal 156 indicates to motion management system 140 that it is to deploy its motion removal component 140A. In other words, trigger signal 156 is used by motion management system 140 to apply damping to berth 102 with the aid of spring elements 132 of secondary suspension 122 with which motion management system 140 cooperates. Motion removal component 140A can discontinue damping after the event, once differential signal 162 returns to its original noise-floor level.

In some embodiments the signals from sensors 146, 148 can be considered with different weights. For example, when sensors 146, 148 are accelerometers differing weights can be used on their filtered and processed signals that correspond to absolute velocities that represent first time derivatives $\dot{z}$ of changes in the vertical degree of freedom.

In that case, the processing includes integrating the signal from sensor 148 and using low-pass rejection filter 160 on the output of the signal from sensor 148 to determine the absolute velocity of berth 102 with passenger 104 thereon can be given a 70% weighting. Meanwhile, integrating the signal form sensor 146 and using low-pass rejection filter 158 on the output of the signal from sensor 146 to determine the absolute velocity of vehicle 106 to which berth apparatus 100 is mounted can be given a 30% weighting. Vibration detection system 142 can then combine the two thus weighted velocity signals from sensors 146, 148 to produce the final output signal to motion management system 140. The latter uses the thus generated final output signal to command motion removing component 140A to remove unwanted motion due to vibrations 112.

In other embodiments, the signals from sensors 146, 148 of vibration detection system 142 are filtered to obtain only the "jerk" components.

In other words, only the third order time derivative $\dddot{z}$ signals along the vertical direction from sensors 146 and 148 are used. These signals may be weighted, as above, or not. Jointly, they are used to produce the output signal to motion management system 140.

Of course, it is also possible to simply use the pure acceleration signal generated by sensors 146, 148. In those cases, no integration or differentiation of the signals is required. However, appropriate signal conditioning and filtering, e.g., with DC filters to remove unwanted signal components may be required. A person skilled in the art will know how to perform the requisite signal processing under these conditions.

In accordance with the invention, it is important to manage both undesired or unwanted motion and desired motion of berth 102 supported on secondary suspension 122 of berth apparatus 100 mounted in vehicle 106. At times when vehicle 106 is stationary, e.g., parked or re-fueling, unwanted motion of berth 102 due to vibrations 112 created when vehicle 106 is travelling is absent. Under these circumstances, desirable motion can be simply added to berth 102 by motion adding component 140B to promote relaxation or induce sleep in passenger 104 without motion removing component 140A having to manage undesirable motion at the same time.

The diagram of FIG. 6A illustrates how motion adding component 140B is deployed in motion management system 140 under the simple conditions when vibrations 112 created during vehicle travel are absent because vehicle 106 is not travelling. At this time, inhalation monitoring device 144 measures and communicates an inhalation cycle signal 164 either directly or indirectly (e.g., via computer 126, see FIG. 1) to motion management system 140. As is seen from the graph of the amplitude of inhalation cycle signal 164 as a function of time, signal 164 has peaks corresponding to maximum inspiration and troughs or valleys corresponding to maximum expiration. Depending on the exact type of device 144 and its resolution, the peaks and troughs may be captured more or less accurately. In any event, it is important is to capture the mean frequency of inhalation cycle signal 164. It is also helpful to at least obtain an estimate of the neutral level and the mean level of the inhalation cycle of passenger 104, as indicated for the graph of signal 164 in the present example. Knowledge of these values can help to recover aspects of inhalation cycle signal 164 for a particular passenger 104 under noisy and poorly controlled conditions that may arise from time to time during vehicle travel.

Motion management system 140 receives inhalation cycle signal 164 and passes it, either after signal conditioning (e.g., noise removal, filtering, amplification, etc.) or in the raw form, to motion adding component 140B. Motion adding component 140B generates a net actuation signal 166 that matches the frequency of signal 164. Actuation signal 166 encodes for applying to berth 102 via secondary suspension 122 and its resilient elements 132 (see FIG. 4B) a desired motion 168. In the present example, only desired motion in the most important vertical degree of freedom, i.e., linear displacement along the Z axis is being actuated.

In accordance with the invention, actuation signal 166 encodes for desired motion 168 contained within range of small amplitude 154 from about 4 mm to about 40 mm (also see FIG. 4B). The frequency of desired motion 168 is matched and synchronized in phase with the frequency of the passenger's 104 breathing or inhalation, as captured by inhalation cycle signal 164 obtained from inhalation monitoring device 144. To achieve the calming effects that promote relaxation in alert passenger 102 and induce sleep desired motion 168 excludes various types of non-smooth motion. These excluded non-smooth motions generally include 'square', 'triangle' or 'saw-tooth' waves.

A natural choice for desired motion 168 is a sinusoid matched in frequency to inhalation cycle signal 164. Actuation signal 166 is generated or encoded to produce such desired motion 168. Furthermore, modifications that include pauses at the top of motion and/or at the bottom of motion 168 can be added. The length of such pauses may be chosen to closely mimic the inspiration and exhalation pauses seen in inhalation cycle signal 164. Actuation signal 166 should be encoded to ensure that the transitions between the sinusoidal portions and the pauses in desired motion 168 applied to berth 102 not be abrupt.

In order to apply desired motion 168 to berth 102, resilient elements 132 need to be active or at least semi-active, such that they can respond and implement actuation signal 166. In the present embodiment, elements 132 are driven by appropriate motors (not shown) belonging to secondary suspension 122. Hence, actuation signal 166 is intended to be applied to these motors, which in turn act on resilient elements 132 to induce desired motion 168. A person skilled in the art will be familiar with active systems that are appropriate for this task.

When passenger 104 is awake, he or she can actually set desired motion 168 that departs from their inhalation cycle or is their desired inhalation cycle that they expect to reach when relaxed or asleep. When that happens, actuation signal 166 that is generated based on inhalation cycle signal 164 is suspended or disregarded by motion adding component 140B. Instead, motion adding component 140B generates actuation signal 166 in accordance with desired motion 168 to promote relaxation or induce sleep as requested by passenger 104.

For example, passenger 104 may like a sinusoid desired motion 160 with a 6.5 second period and 1 second pauses at the end. The small amplitude may be 24 mm, thus fitting within range of small amplitude 154 set for desired motion 160. Another passenger may prefer a basic sinusoid with a 3.5 second period and the small amplitude set at 40 mm. The frequency and amplitude of desired motion 168 set by passenger 104 may even be high enough to emulate a massage-type motion, as perceived by passenger 104. The passenger selected desired motion 160 can be set to continue during vehicle travel, or it may be set to discontinue in favor of desired motion 168 as computed by motion adding component 140B based on the measured breath or inhalation cycle of passenger 104. The transition may be set on a timer.

The diagram of FIG. 6B illustrates how motion removing component 140A is deployed in motion management system 140 under vehicle travel conditions when vibrations 112 are present. Only vibrations 112 producing unwanted motion of berth 102 in the vertical degree of freedom along the Z axis are considered. Vibrations 112 contained within travel range 150 are shown in a graph of vertical displacement along the Z axis over time. Because of the rigid mechanical connection, vibrations 112 are transmitted to berth apparatus 100, as indicated by the thick dashed arrow.

Vibration detection system 142 picks up vibrations 112 in the form of a corresponding vibration signal, e.g., a differential signal using its sensors 146, 148 (see FIG. 1) and transmits it to motion management system 140. Motion management system 140 forwards the reported vibration signal either in raw form or after signal conditioning to motion removing component 140A. In response to the received vibration signal, motion removing component 140A produces a vibration cancellation or unwanted motion removal signal 170 to be applied to berth 102 in the Z axis in order to remove unwanted motion in this degree of freedom caused by vibrations 112.

Signal 170 encodes for applying to berth 102 via secondary suspension 122 and its resilient elements 132 (see FIG. 4B) a cancellation motion or active damping in the vertical degree of freedom. The resultant damped motion 112' experienced by berth 102 is shown in corresponding graph. This graph shows the displacement along the vertical in time experienced by berth 102 under the application of motion cancellation by resilient elements 132 based on unwanted motion removal signal 162 generated by motion removing component 140A.

Motion management system 140 may take advantage of any suitable combination of vibration isolation or management elements in its motion removing component 140A. In the simplest case, these may simply be passive components. In other words, resilient elements 132 of secondary suspension 122 that cooperates with motion removing component 140A may be embodied by fully passive springs or resilient elements 132.

In principle, a multitude of passive vibration isolation elements known to those skilled in the art can serve the function of resilient elements 132 that appropriately dampen the vertical displacement motion due to vibrations 112. The "spring forces" or restitution forces of such elements are typically in proportion to displacement from the default or equilibrium position along the axis in which they act. In the present case, we are initially only considering the Z-axis and hence elements 132 that exhibit "spring forces" along the vertical Z-axis. The "damping" force of elements 132 is proportional to the velocity (first order time derivative, here $\dot{z}$) of berth 102 with respect to berth apparatus 100 or, equivalently, with respect to vehicle 106 to which berth apparatus 100 is rigidly attached. It is this "damping" force that removes oscillatory motion of berth 102 caused by vibrations 112 to produce damped response 112'. A person skilled in the art will recognize this as the classic solution in a spring-damper system that results in a damped response to disturbances.

A vibration control method that is common in the prior art and may be deployed here is a "sky damper". This method, applied to vertical motion along the Z-axis, imagines connecting a damping device between berth 102 and some imaginary point in the sky that is fixed in height but moving forward with vehicle 106. For example, origin 124 of body coordinates 120 may be placed at such imaginary point in the sky.

The most practical sensor for detecting vertical motion is an accelerometer, i.e., accelerometer 148, that reports vertical acceleration or $\ddot{z}$ of berth 102. This is typically a noisy signal. A control signal based on the vertical jerk, or $\dddot{z}$ would require differentiating the noisy $\ddot{z}$ signal. This would result in a very noisy signal.

A damper, on the other hand, requires integrating the $\ddot{z}$ signal with respect to time. This results in a naturally smoothed function of time. Residual noise may be reduced by applying a low pass filter that rejects high frequency noise. The only hazard is accumulated small errors that cause the signal to wander. This is readily removed by employing a high pass filter also known as a DC blocker. The high pass and low pass filters applied together constitute a 'band-pass' filter which will be familiar to one skilled in the art. Selection of corner frequencies depends on the particular system dynamics of the spring-mass-damper system.

The time-honored 'sky-hook' has the additional advantage of being generally stable. That is, it does not induce system oscillations as many feed-back systems are prone to do. But it is limited in the reduction of vertical motion of berth 102. A second term proportional to vehicle's $\ddot{z}$ may also be added. This term tends to lead the bed signal. Careful selection of the gain for each of these terms may result in over 90% reduction in vertical motion. The coefficients may be dynamically adjusted to suit the road conditions and for weight of passenger 104.

It is noted that in embodiments where motion removing component 140B relies only on passive elements of secondary suspension 122 additional elements will be required to impart the desired motion to berth 102 by motion adding component 140B. In addition, when working with passive elements, it is preferable that they be embodied by wire-rope isolators.

In some embodiments, resilient elements 132 may exhibit a small or even a zero spring constant K at the equilibrium pose of berth 102. Indeed, spring constant K may even be configured to be negative in some embodiments. These will be more appropriate in embodiments with semi-passive (or semi-active) as well as fully active elements 132. In any case, the choice should be made to ensure the most comfort to passenger 104 given the range of expected vibrations 112.

Berth apparatus 100 defines a certain range of allowable or tolerable mechanical movement or travel 150 for berth 102 in the at least one degree of freedom that is being monitored and adjusted by removal of unwanted motion and addition of desirable motion. In the present example this is the vertical movement. Note that range of travel 150 in Z being between 5 and 10 cm than small amplitude 154 of desirable motion that is between 4 mm and 40 mm. This ensures that desirable motion 168 added by motion adding component 140B of motion management system 140 does not tend to "bottom out" under most vehicle travel conditions even after undesired or unwanted motion is removed by motion removing component 140A. Furthermore, the berth apparatus has a motion limiting mechanism for limiting the range of travel of the berth. For example, the motion limiting mechanism can be embodied by a snubber that enforces a mechanical arrest at an end of the range of travel. Near the ends of travel 150 the force on berth 102 thus becomes very high and ultimately practically infinite.

The second most important degree of freedom is rotation about rotation axis ROLL, initially collinear with the X axis and given by rotation angle (p and its time derivatives, i.e., $\dot{\varphi}$, $\ddot{\varphi}$ and $\dddot{\varphi}$. In the present example, for the sake of clarity, any shift of the center of rotation 124 from which berth 102 is effectively suspended and which is taken as the origin of body coordinates 120 is disregarded. The manner to adding desirable motion and removing unwanted or undesired motion in this second degree of freedom follows the same principles as described for the most important degree of freedom, i.e., linear displacement along the vertical or Z-axis.

It should be noted, that berth apparatus 100 according to the invention can be adapted for installation in vehicles that do not travel on wheels. For example, berth apparatus 100 can be installed in a marine vehicle, an aircraft or still other transport or conveyance means.

FIG. 7 illustrates an exploded perspective view of another exemplary berth apparatus 200 according to the invention. For clarity, only presently relevant parts and elements of berth apparatus 200 are shown. Berth apparatus has a berth 202 with a flat top platform 202A for placing thereon items required by a recumbent passenger (not shown) including a mattress, bedding and any berth enclosure(s). Berth 202 has a bottom surface 202B equipped with elements and attachment points for allowing berth 202 to move in all six degrees of freedom and also to remove and apply motion to all six degrees of freedom.

Berth apparatus 200 also has a mounting frame 234 designed to be attached to a vehicle (not shown). Instead of additional mechanical fixture(s) or elements, mounting frame 234 is attached rigidly and directly to the vehicle, e.g., to the vehicle's mechanical frame, using affordances 236 integrated with frame 234. Affordances 236 can include mounts and various mechanical engagement mechanisms, or simply holes for mounting screws, as in the present embodiment. When thus attached inside the vehicle, mounting frame 234 is fixed in vehicle coordinates 118 described by cartesian axes X, Y, Z, as in the prior embodiment.

Berth apparatus 200 is further equipped with a secondary suspension 222 for supporting berth 202 and the recumbent passenger. Secondary suspension 222 is again designed to keep berth 202 in a default or equilibrium position and orientation, jointly referred to as pose. In equilibrium pose the body coordinates 120 parameterizing the position and orientation of berth 202 using cartesian axes $X_b$, $Y_b$ and $Z_b$ are centered at origin 124. Origin 124 is offset from the origin of vehicle coordinates 118 by a known amount while body and vehicle coordinate axes are either aligned or maintain a known relative orientation to each other.

In the present embodiment, secondary suspension 222 deploys passive, semi-passive and active elements to enable motion in all six degrees of freedom with some degrees being very constrained or limited (e.g., yaw). Secondary suspension 222 also uses its active elements to remove unwanted motion and impart desired motion to berth 202. In addition, secondary suspension 222 has three passive linkages 231A, 231B, 231C to allow berth 202 to move. Linkages 231A, 231B, 231C attach to bottom surface 202B at attachment points 203A, 203B, 203C, respectively. Only attachment point 203A to which passive linkage 231A is attached as indicated by dashed arrow A is visible in FIG. 7.

Secondary suspension 222 has two pneumatic valve springs 232A, 232B that serve as semi-active vibration isolation elements to primarily control up and down movement of berth 202 along the Z-axis. Pneumatic components are well-developed for commercial applications and a wide variety of air springs, valves, dampers and similar devices is commonly available. Although in laboratory environments it is common to deploy three or more air bladders that are automatically filled by mechanical valves when displaced from a set point, in the present invention as few as one air bladder may be used. The air bladder is used to lift a passenger in the berth 202. The stiffness of the bladder is directly proportional to its cross-sectional area. Modest diameters result in a low resonant frequency with high rejection of vibration typically present in the unwanted motion.

It should also be noted that steel springs rather than semi-passive vibration isolation elements such as pneumatic bladders can be used in the present invention to provide the lifting force. In fact, arrangements of springs and levers configured to exhibit a zero or a negative spring constant K about the equilibrium position of berth 202 can be used. Such spring and lever arrangements are known to those skilled in the art. Coupled with a linear spring this solution creates an ideal zero K spring constant with nearly zero coupling. Of course, this is only the case in a narrow range of motion. To accommodate a wide range of passengers, the zero position may be adjusted by using a small actuator such as an electric gear motor. In any case, suitable damping must also be provided by using pneumatic, hydraulic, electro- or magneto-rheologic elements. The dampers may be fixed or adjustable.

In particular, the present embodiment uses two air bladders or pneumatic springs 232A, 232B attached to attachment points 203D, 203E on bottom surface 202B of berth 202. Just attachment point 203D is visible in FIG. 7. Dashed arrow B indicates how pneumatic spring 232A is mounted at attachment point 203D thereto. An air source 229A and associated air pump 229B for operating pneumatic springs 232A, 232B are provided on mounting frame 234. Valves, hoses and associated parts are not shown herein, but persons skilled in the art will be familiar with the operation of pneumatic spring valves of the type used herein.

Secondary suspension 222 also has an active element or assembly 233 that includes four DC drive motors 233A, 233B, 233C, 233D and associated drive linkages, not expressly labelled herein, to actively control the motion of berth 202. A single attachment link 235C of active assembly 233 for mounting to berth 202 at bottom surface 202B is shown in FIG. 7. Elements 203F through 203I provided in bottom surface 202B are designed for mounting attachment links, such as attachment link 235C of active assembly 233. Of those, only the first and last, namely 203F and 203I are visible in FIG. 7. Mounting of attachment link 235C to the occluded element 203H is indicated by arrow C.

A motion management system 240 is mounted on frame 234 of secondary suspension 222. Motion management system 240 has a motion removing component 240A and a motion adding component 240B integrated within. The operation of these motion removing and motion adding components 240A, 240B is similar to the previous embodiment. The main difference is that unwanted and desired motion in all six degrees of freedom is involved in the present embodiment.

During operation, berth apparatus 200 is preferably also triggered using a vibration detection system deploying a differential signal. Once put into operation, motion removing component 240A produces the requisite vibration removal signal and applies it to active assembly 233 to remove unwanted motion by active damping of the vibrations being experienced by berth 202. Meanwhile, pneumatic springs 232A, 232B also provide motion damping for berth 202.

In addition, berth apparatus 200 is also deploying motion adding component 240B to produce a desired motion of low frequency and small amplitude, preferably related to a physiological parameter of the passenger. As before, the preferred physiological parameter may be related to the inhalation cycle of the passenger on berth 202. The requisite actuation signal is provided to active assembly 233.

Of course, the vibration removal and desired motion actuation signals will in some cases overlap for certain degrees of freedom; in particular along the vertical or z-direction. Hence, motion management system 240 will deploy any suitable known control law in adding these two signals that are to be applied. A person skilled in the art will be familiar with various ways of deriving a net actuation signal from two inputs.

Conveniently, in some embodiments a z-bias can be set and maintained with the aid of pneumatic springs 232A, 232B. In other words, the equilibrium position along the z-direction is altered from $\Delta z=0$ as it was in the previous embodiment (see also FIGS. 4A & 4B). The z-bias adjustment can be made by the passenger. This adjustment may depend on the physical size of the passenger (e.g., the passenger's weight and/or height) and it may be required for the passenger's comfort while recumbent in berth 202. The adjustment will typically be made when the passenger is setting up berth 202 to accommodate them in a comfortable manner. Once made, the equilibrium position of berth 202 will be altered. Of course, the passenger may wish to also apply a bias to other degrees of freedom within their range of comfort. Such extensive bias adjustments will change the equilibrium pose of berth 202.

In certain embodiments motion management system 240 has a vibration transfer element to further facilitate handling of undesirable motion and/or to aid in the addition of desirable motion. FIG. 8 is a schematic diagram illustrating the operation of a vibration transfer element of motion management system 240. In this case the transfer element resides entirely in the software that produces actuation signals for motion removal. In other words, motion removing component 240A and the signal it produces for applying to berth 202 by active assembly 233 to remove the unwanted motion is modified in the embodiment of FIG. 8.

In this embodiment two degrees of freedom are involved. The first is horizontal displacement along the Y-axis, i.e., y-displacement or $\Delta y$. The second degree of freedom is roll about the X-axis defined by angle $\varphi$. Note that the X-axis is co-extensive with the direction of travel TD of the vehicle.

FIG. 8 illustrates berth 202 by itself without secondary suspension 222 and motion management system 240. Berth 202 is drawn in solid lines in its equilibrium pose. Although the equilibrium pose of berth 202 may include a bias, as discussed above, any such bias is not considered in the present embodiment for reasons of clarity.

When the vehicle experiences a vibration that causes a y-displacement that is illustrated by a shift in vehicle coordinates 118 indicated by $\Delta y$, berth 202 will initially tend to remain in place due to inertia and then be pulled in the direction of $\Delta y$. It is this unwanted motion in the horizontal degree of freedom along the Y-axis that motion management system 240 can transfer to the rotational degree of freedom about the X-axis. The amount of rotation in this degree of freedom is expressed by roll angle φ, as shown. As a result of this transfer, the passenger will experience a "side-to-side rocking" and a reduced sense of unwanted movement sideways along the Y-axis. Berth 202' drawn in a dashed line indicates the pose it will initially assume when motion management system 240 is configured to make this motion transfer and use roll angle φ as an absorber degree of freedom. The amount of roll is exaggerated in FIG. 8 for clarity, since normally the amount of roll should be kept to within a few degrees, e.g., 3 degrees to 7 degrees.

Although the technique of transferring between translational and rotational degrees of freedom to absorb some of the more disturbing unwanted motion may be practiced between other degrees of freedom (e.g. pitch and translation along the X-axis) Y-axis displacement and roll are the most convenient and preferred. That is because transferring between other degrees of freedom may actually lead to more discomfort and even endangerment of the passenger. For example, transferring between pitch and translation along the Y-axis may become problematic when the vehicle is stopping and starting again abruptly. Under such circumstances the absorber degree of freedom may receive excessive amounts of energy that would be better dealt with by motion stops that arrest the travel of berth 202.

It should be noted that other solutions exist to allow a berth to move in all six degrees of freedom. One example known to those skilled in the art is a "Stewart platform". Still other kinematic arrangements with fewer degrees of freedom may be used. They may be used in conjunction with passive and semi-passive vibration isolation elements described herein.

FIG. 9A shows a set of berth apparatus 300 that can be similar to berth apparatus 100 or berth apparatus 202 installed above each other or stacked in a train 302. In most vehicles, such as in train 302 in which berth apparatus 100 of the invention is deployed the amount of floorspace is limited. It is thus important to ensure that each berth has a compact footprint 304 (length and width). As seen in exemplary berth apparatus 200 of the previous embodiment (e.g. see FIGS. 8), berth 202 may assume a non-rectangular geometry to reduce its footprint. In fact, in the case of berth 202 its wider end is designed to accommodate the passenger's head while the narrower end is designed to still be wide enough to comfortably accommodate the passenger's legs.

It is also important that each berth in the set of stacked berth apparatus 300 also have a reduced vertical clearance 306 (along the Z-axis), as shown in FIG. 9B. For example, a preferred reduced vertical clearance 306 may be less than about 60 cm. This limitation is practicable even when the passenger is a mature male or female human. Of course, the passenger may not always be a human and may instead be embodied by, e.g., a domestic animal or a pet being transported by itself or in the company of its owner. It is worth noting that berth apparatus 200 helps to achieve this objective through its use of low-profile frame 234 and efficient integration of the elements of secondary suspension 222 (see FIG. 7). Furthermore, to maintain a low-profile it is also possible to integrate passive or semi-active elements of the secondary suspension mechanisms within the berth itself. For example, a sufficiently sturdy floor plate of the berth could accommodate coiled springs or other elements that the secondary suspension may deploy in damping unwanted motion and/or adding desired motion to the berth.

FIG. 10A is a perspective view of still another berth apparatus 400 designed to operate actively in two degrees of freedom and to actively dampen unwanted motion in up to six degrees of freedom. The two actively controlled degrees of freedom are vertical (z-direction) and roll (rotation about the X-axis described by roll angle φ). Berth apparatus supports a berth 402 with enclosing side walls 402A, 402B, 402C, 402D. Berth 400 has a floor plate 402E that supports a mattress 403. Preferably, floor plate 402E is made of a durable material such as plywood. Side walls 402A, 402B, 402C, 402D may also be made of plywood or other durable material.

Berth 402 is mounted on a frame 404 designed to be attached directly to a floor of a vehicle (not shown). This configuration of berth apparatus 400 is not suitable for stacking, but it is very sturdy and easy to service.

FIG. 10B is an exploded perspective view of berth apparatus 400 of FIG. 10A that shows more construction details. Specifically, FIG. 10B illustrates how floor plate 402E is mounted to a deck 406, which is in turn attached to rails 408A, 408B of frame 404. Deck 406 should be attached at many points to rails 408A, 408B and it should be made of a strong plate of plywood or still more durable material. This construction ensures a very robust mechanical connection between berth 402 and frame 404.

FIG. 10C shows a preferred method of attaching deck 406 to rails 408A, 408B with passive vibration isolation elements. Note that in this view deck 406 is fabricated in two sections to facilitate installation into berth 402. In the present case wire-rope isolators 410A, 410B are used as passive vibration isolation elements. Isolators 410A, 410B are made of multiplicities of spring loops made of steel cable. The stiffness of the loops is determined by the wire diameter and loop diameter and can be adjusted as needed. The spacing of the loops may be varied to match the uneven distribution of load presented by a typical passenger.

Passive isolators 410A, 410B can dampen motion in each of the six degrees of freedom, including the most important vertical (z-direction). The stiffness of isolators 410A, 410B is well defined in each direction of deflection. Commonly, the compression spring rate is about twice the shear spring rate. In the angled arrangement shown in FIG. 10C the vertical spring rate is a combination of these two rates. When subject to lateral acceleration, the outer spring is in compression and the inner spring in shear. This also results in modest compensation of roll about the X-axis.

In returning now to FIG. 10B, we note that isolators 410A, 410B shown in FIG. 10C actually constitute a part of a secondary suspension assembly 412 of berth 400. Specifically, isolators 410A, 410B represent the passive elements of secondary suspension assembly 412. Meanwhile, the active vibration isolation elements of secondary suspension assembly 412 include a drive motor 414 and associated linkages 416 to control z-axis movement and roll about the X-axis.

Berth apparatus 400 also has a motion management system 418 with integrated motion removing component and motion adding component. These components are not explicitly shown in the present drawing figure, but they can be analogous to correspondent components described in the previous embodiment illustrated in FIGS. 6A&6B. Requisite sensors 420A, 420B for triggering and activating the motion removing component of system 418 are also provided on berth 402 and frame 404, respectively. Note that isolators 410A, 410B (see FIG. 10C) are passive and automatically provide for some damping or removal of unwanted motion in all six degrees of freedom without deploying the active parts of secondary suspension assembly 412.

The motion adding component of system 418 can be set to add a desirable motion in at least one of the two controlled degrees of freedom, i.e., movement along the vertical z-axis and/or roll described by roll angle φ about the X-axis. The latter may be perceived as a "rocking motion" by the passenger. The setting of the desirable motion can be initially performed by the passenger. However, the desirable motion preferably reverts to a small amplitude and low frequency motion based on a physiological parameter of the passenger when he or she is recumbent and relaxed. For example, the passenger may set a massage-like desirable motion at the outset. As the passenger's physiological parameter indicates transition to relaxation, drowsiness and sleep the desirable motion transitions to the small amplitude and low frequency motion dictated by the physiological parameter.

During operation, secondary suspension assembly 412 uses its active and passive elements to dampen or remove from berth 402 unwanted motion in all six degrees of freedom. At the same time, motion adding component 418 is adding to berth 402 desirable motion in the actively controlled vertical and roll degrees. This situation can be advantageously managed by a control circuit (not shown). Suitable control circuits may deploy various types of control loops in conjunction with models of the sprung mass as known in the art to ensure that both removal of unwanted motion and addition of desired motion are performed efficiently and without introducing jarring motions. A person skilled in the art will recognize that these circuits need to apply signal processing to generate and to properly combine both vibration removal signals and actuation signals. The resultant of these signals or the net actuation signal is then applied by motion removing and motion adding components of motion management system 418. In the present embodiment, the executors of the net actuation signal for the vertical and roll degrees of freedom are the active elements of secondary suspension 412. In particular, motor 414 and its linkages 416 are controlled or driven by the net actuation signal.

In some advantageous embodiments motion management system 418 will configure the control loops of the control circuit to include a filter for passing components of motion of the vehicle that are already in the range of the desirable motion to berth 402. This effectively reduces the load on the active part of secondary suspension assembly 412. Specifically, it reduces the amount of power consumed by drive motor 414 in actively adjusting berth 402 via linkages 416. This type of benefit may accrue especially in situations when the vehicle itself is already in motion rather than stationary. Certain vehicles such as trains are known to often produce components of desirable motion while traveling at their target velocity.

From the above description it should be clear that many alternative embodiments are possible. The berth of invention may be implemented in different configuration(s) depending on type of vehicle and space constraints. For example, when vertical clearance is not an issue, the range of travel as well as the low amplitude in the desired motion can be increased. For example, the low amplitude may range beyond 40 mm up to about 100 mm when headroom is available. In embodiments with such extended low amplitude range the passenger should be allowed to provide the motion management system with their desired limit, since the perception of desirable and pleasant motion at larger amplitudes varies from person to person.

FIGS. 11A & 11B illustrate yet another berth apparatus 500 using still other suitable semi-passive and active elements in a secondary suspension 502 according to the invention. FIG. 11A is a front plan view of berth apparatus 500 with a berth 504 in the equilibrium pose. Body coordinates 120 are used here to better illustrate the position and orientation of berth 504 whose base or floor plate is shown without the remaining berth parts for reasons of clarity. Secondary suspension 502 deploys struts 506A, 506B in conjunction with linkages 508A, 508B driven by motor 510 to control the vertical degree of freedom and roll of berth 504.

In the plan view the body $Y_b$ and $Z_b$ axes are visible and define the plane of the drawing figure. The $X_b$ axis points out of the plane of the drawing. Origin 124 of body coordinates 120 is located at the instantaneous center of rotation of berth 504. The equilibrium position and orientation shown is assumed by berth 504 when no external forces act on it.

FIG. 11B illustrates berth 504 displaced and rotated away from its equilibrium pose. Body coordinates 120' are displaced by $\Delta y$ and they are also rotated by a few degrees about displaced origin 124', which is now the instantaneous center of rotation. The corresponding mechanical adjustments occurring in semi-active and active elements 506A, 506B, 508A, 508B supporting the instantaneous pose of berth 504 are also shown. Note that the stiffness of struts 506A, 506B may be set by controlling their damping, e.g., to make accommodations for the passenger's size and weight, or they may operate without any adjustments once installed.

The entire movement of berth 504 occurring between the views of FIGS. 11A & 11B may be the desired motion requested by the passenger and appropriately actuated via the motion control system (not shown). This movement may also be an actively controlled removal of unwanted motion that uses the roll degree of freedom to transfer lateral or horizontal displacement in the y-direction caused by vibrations.

It will be evident to a person skilled in the art that the present invention admits of various other embodiments. Therefore, its scope should be judged by the claims and their legal equivalents.

The invention claimed is:

1. A berth apparatus having a berth for accommodating a recumbent passenger, said berth apparatus being mounted in a vehicle and comprising:
    a) a secondary suspension for supporting said berth;
    b) a vibration detection system comprising at least one sensing element for detecting an unwanted motion of said berth produced by vibrations in at least one degree of freedom of rigid body motion;
    b) a motion management system in communication with said vibration detection system, said motion management system comprising said secondary suspension and further having:
        i) a motion removing component for removing from said berth said unwanted motion in said at least one degree of freedom, said motion removing component having at least one element selected from the group consisting of passive vibration isolation elements, semi-passive vibration isolation elements and active vibration isolation elements;
        ii) a motion adding component for adding to said berth a desirable motion in said at least one degree of freedom, said desirable motion having a low frequency and a small amplitude and being based on a physiological parameter of said recumbent passenger.

2. The berth apparatus of claim 1, wherein said physiological parameter is the inhalation cycle of said recumbent passenger and said desirable motion is a sleep-inducing motion wherein said low frequency is related to said inhalation cycle and said small amplitude is contained in a range between about 4 mm and about 40 mm.

3. The berth apparatus of claim 2, wherein said sleep-inducing motion is actively adjusted by said motion management system with the state of said recumbent passenger.

4. The berth apparatus of claim 2, wherein said sleep-inducing motion is adjusted by said recumbent passenger.

5. The berth apparatus of claim 1, wherein said motion management system comprises a filter for passing components of motion of said vehicle within a range of said desirable motion to said berth.

6. The berth apparatus of claim 1, wherein said at least one sensing element comprises a first accelerometer mounted on said vehicle and a second accelerometer mounted on said berth.

7. The berth apparatus of claim 1, wherein said motion management system comprises at least one vibration transfer element for transferring a horizontal displacement to a roll about a direction of travel of said vehicle.

8. The berth apparatus of claim 7, wherein said at least one degree of freedom comprises five degrees of freedom including said horizontal displacement and said roll about said direction of travel.

9. The berth apparatus of claim 1, wherein at least one of said semi-passive vibration isolation elements comprises a spring configured to exhibit a zero or a negative spring constant K about an equilibrium position of said berth.

10. The berth apparatus of claim 1, wherein at least one of said passive vibration isolation elements comprises a wire-rope isolator.

11. The berth apparatus of claim 1, wherein said berth has a range of travel in said at least one degree of freedom substantially larger than said small amplitude and said berth apparatus further comprises a motion limiting mechanism for limiting said predetermined range of travel.

12. The berth apparatus of claim 11, wherein said motion limiting mechanism comprises a snubber for enforcing a mechanical arrest at an end of said range of travel.

13. The berth apparatus of claim 1, wherein said berth has a compact footprint and a reduced vertical clearance.

14. The berth apparatus of claim 13, wherein said reduced vertical clearance is less than 60 cm.

15. A method for accommodating a recumbent passenger in a berth apparatus mounted in a vehicle, said method comprising the steps of:
   a) providing a secondary suspension for supporting a berth belonging to said berth apparatus;
   b) detecting an unwanted motion of said berth produced by vibrations in at least one degree of freedom of rigid body motion with at least one sensing element;
   c) managing the motion of said berth using said secondary suspension by:
      i) removing from said berth said unwanted motion in said at least one degree of freedom by using at least one element selected from the group consisting of passive vibration isolation elements, semi-passive vibration isolation elements and active vibration isolation elements;
      ii) adding to said berth a desirable motion in said at least one degree of freedom, said desirable motion having a low frequency and a small amplitude based on a physiological parameter of said recumbent passenger.

16. The method of claim 15, wherein said physiological parameter is the inhalation cycle of said recumbent passenger and said desirable motion is a sleep-inducing motion wherein said low frequency is related to said inhalation cycle and said small amplitude is contained in a range between about 4 mm and about 40 mm.

17. The method of claim 16, wherein said sleep-inducing motion is actively adjusted with the state of said recumbent passenger.

18. The method of claim 16, wherein said sleep-inducing motion is adjusted by said recumbent passenger.

19. The method of claim 15, wherein said physiological parameter is the inhalation cycle of said recumbent passenger and said desirable motion is a relaxation-promoting motion wherein said low frequency is related to said inhalation cycle.

\* \* \* \* \*